US005262958A

United States Patent [19]
Chui et al.

[11] Patent Number: 5,262,958
[45] Date of Patent: Nov. 16, 1993

[54] SPLINE-WAVELET SIGNAL ANALYZERS AND METHODS FOR PROCESSING SIGNALS

[75] Inventors: Charles K. Chui; Andrew K. Chan, both of College Station, Tex.

[73] Assignee: Texas Instruments Incorporated, Dallas, Tex.

[21] Appl. No.: 681,053

[22] Filed: Apr. 5, 1991

[51] Int. Cl.$^5$ ............................................. G06F 15/20
[52] U.S. Cl. ................................ 364/487; 324/76.12; 364/481
[58] Field of Search ..................... 364/481, 486, 487; 324/77 R

[56] References Cited

PUBLICATIONS

Grossman et al: "Reading and Understanding Continous Wavelet Transforms": Ph. TehamiTchian (Eds) 2nd Edition Springer Verlag pp. 2–20.

D. Gabor, (Gabor, D., "Theory of Communication", JIEE (London) 93 (1946), 429–457).

Grossman, A. and Morlet, "Decomposition of Hardy Functions Into Square Integrable Wavelets of Constant Shape," SIAM J. Math. Anal. 15 (1984), 723–736.

Calderon, A. P., "Intermediate Spaces and Interpolation, the Complex Method," Studia Math. 24 (1964), 113–190.

Daubechies, I., "Orthonormal Bases of Compactly Supported Wavelets," Comm. Pure and Appl. Math. 41 (1988), 909–996.

Stromberg, J. O., "A Modified Franklin System and Higher-Order Spline Systems of $R^n$ As Unconditional Bases For Hardy Spaces," in Conference in Harmonic Analysis in honor of Antoni Zygmund, vol. II, W. Beckner, et al. (ed).), Wadsworth Math Series, 1983, 475–493.

Lemarié, P. G., "Ondelettes à Localisation Exponentielle," Journal de Math. Pures et Appl. 67 (1988), 227–236.

Battle, G., "A Block Spin Construction of Ondelettes Part I: Lemarié Functions," Comm. Math Phys. 110 (1987), 601–615.

Mallat, S., "Multiresolutional Representations and Wavelets," Ph.D. thesis, Univ. of Pennsylvania, Philadelphia, 1988, attached herein in its new published version A Theory for Multiresolutional Signal Decomposition: The Wavelet Representation.

Vetterli, M., and Herley, C., "Wavelets and Filter Banks: Theory and Design", Report CU/CTR/TR 206/90/36, Center for Telecommunication Research, Department of Electrical Engineering, Columbia University, New York, N.Y. (1990).

Primary Examiner—Edward R. Cosimano
Attorney, Agent, or Firm—Gary C. Honeycutt; Richard L. Donaldson; William E. Hiller

[57] ABSTRACT

A processor (10) is disclosed which uses a B-spline interpolator (14) to produce a plurality of zero-level spline coefficients $c^0(n)$. This set of coefficients may be fed to a B-spline generator (16) to produce an approximation of the input signal, and/or may be multiplied by a set of coefficients Bn to produce a set of first-level wavelet coefficients $d^{-1}(n)$. The zero-level spline coefficients are also used to create first-level spline coefficients $c^{-1}(n)$. The first-level spline and wavelet coefficient $c^{-1}(n)$ and $d^{-1}(n)$ may be submitted to a respective B-spline generator (22) or B-wavelet generator (24) to produce a first-level spline signal components and a first-level wavelet signal component for extraction of data from the original signal. The signal may in a similar fashion be decomposed to any level of resolution desired. The signal components may then be processed, and an improved signal then reassembled from the last-level spline and the processed wavelet signals. Novel spline and wavelet generators are also disclosed.

23 Claims, 22 Drawing Sheets

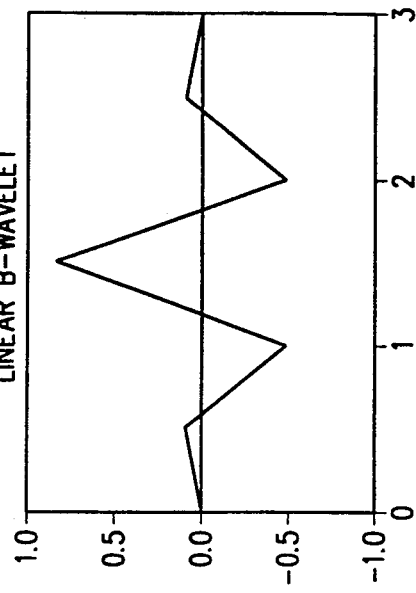
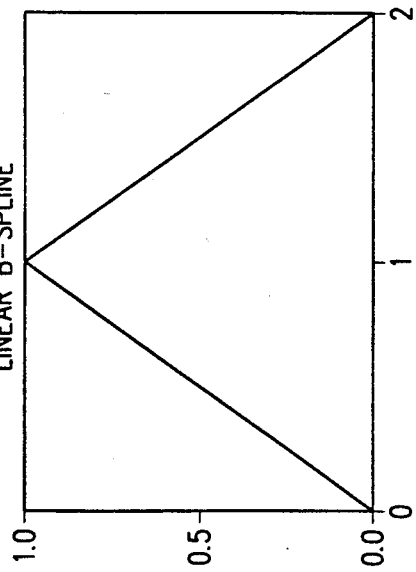
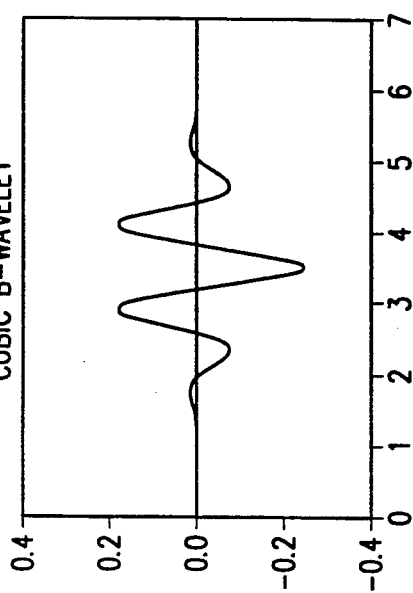
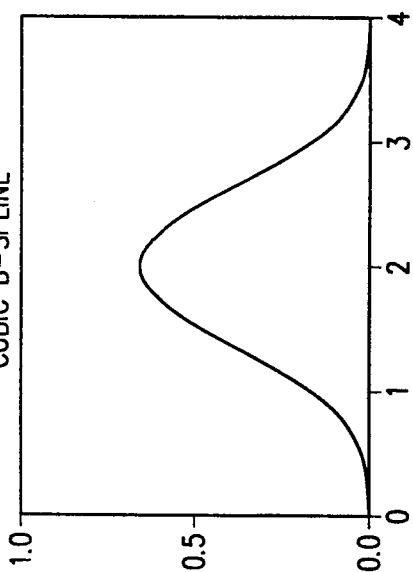
FIG. 1a LINEAR B-SPLINE
FIG. 1b LINEAR B-WAVELET
FIG. 2a CUBIC B-SPLINE
FIG. 2b CUBIC B-WAVELET

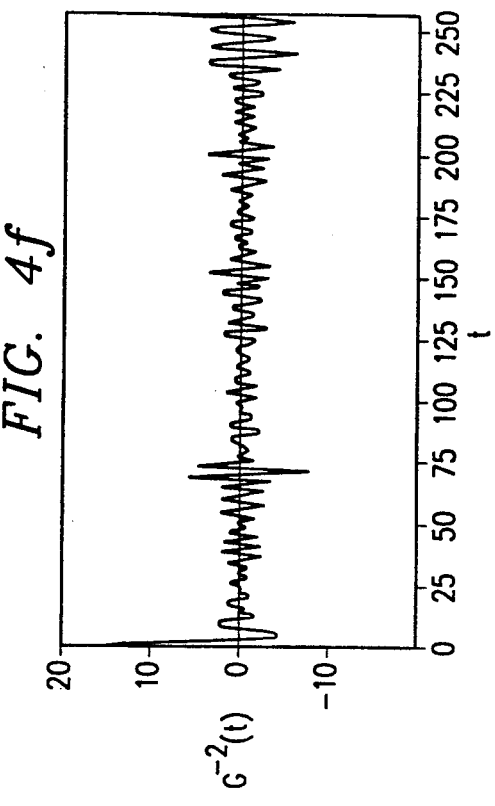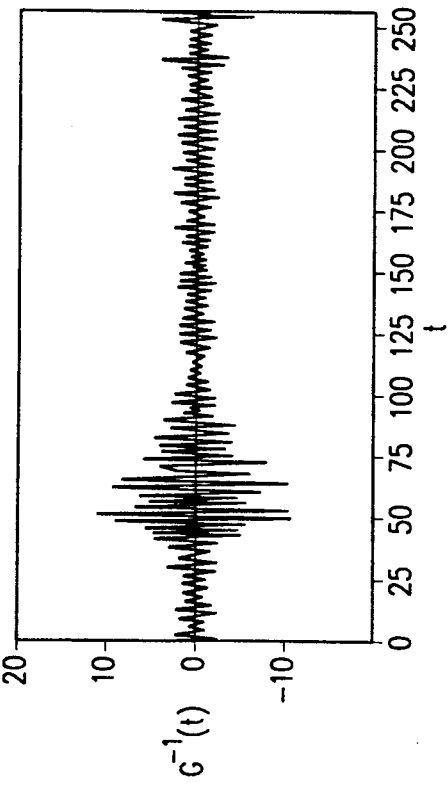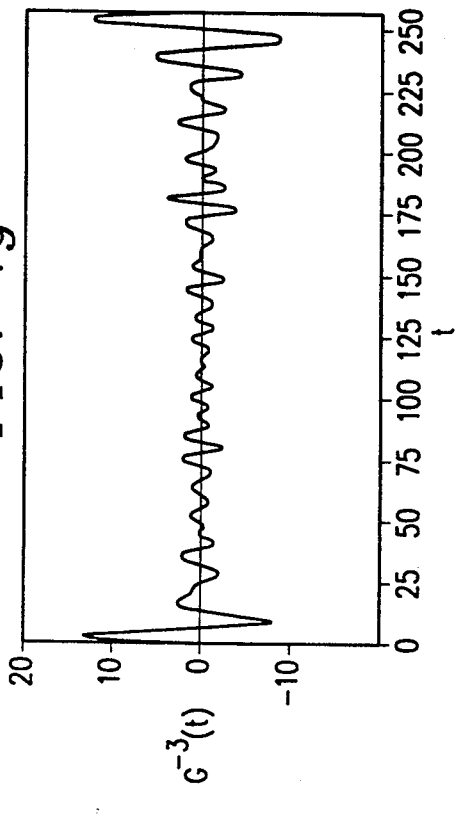

B-WAVELET
m=4

B-WAVELET
m=3

B-WAVELET
m=2

FOURIER TRANSFORM
m=4

FOURIER TRANSFORM
m=3

FOURIER TRANSFORM
m=2

DUAL WAVELET
m=4

DUAL WAVELET
m=3

DUAL WAVELET
m=2

FOURIER TRANSFORM
m=4

FOURIER TRANSFORM
m=3

FOURIER TRANSFORM
m=2 m=2 m=4

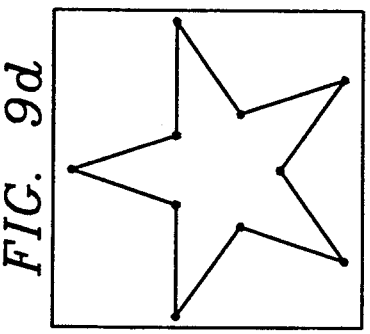
FIG. 9d
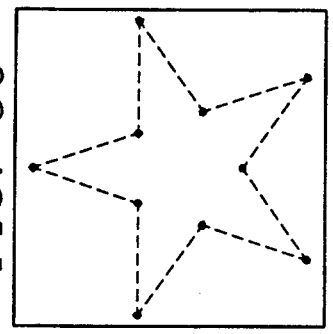
FIG. 9c
FIG. 9b
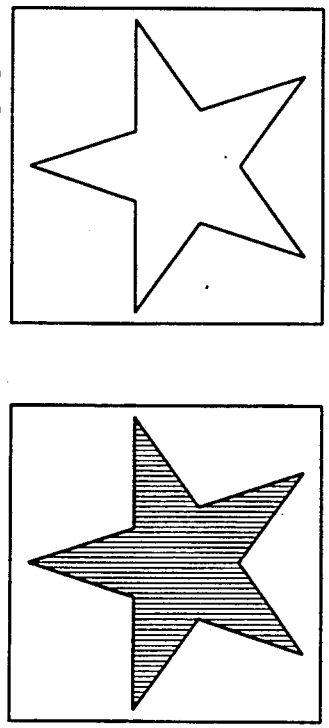
FIG. 9a
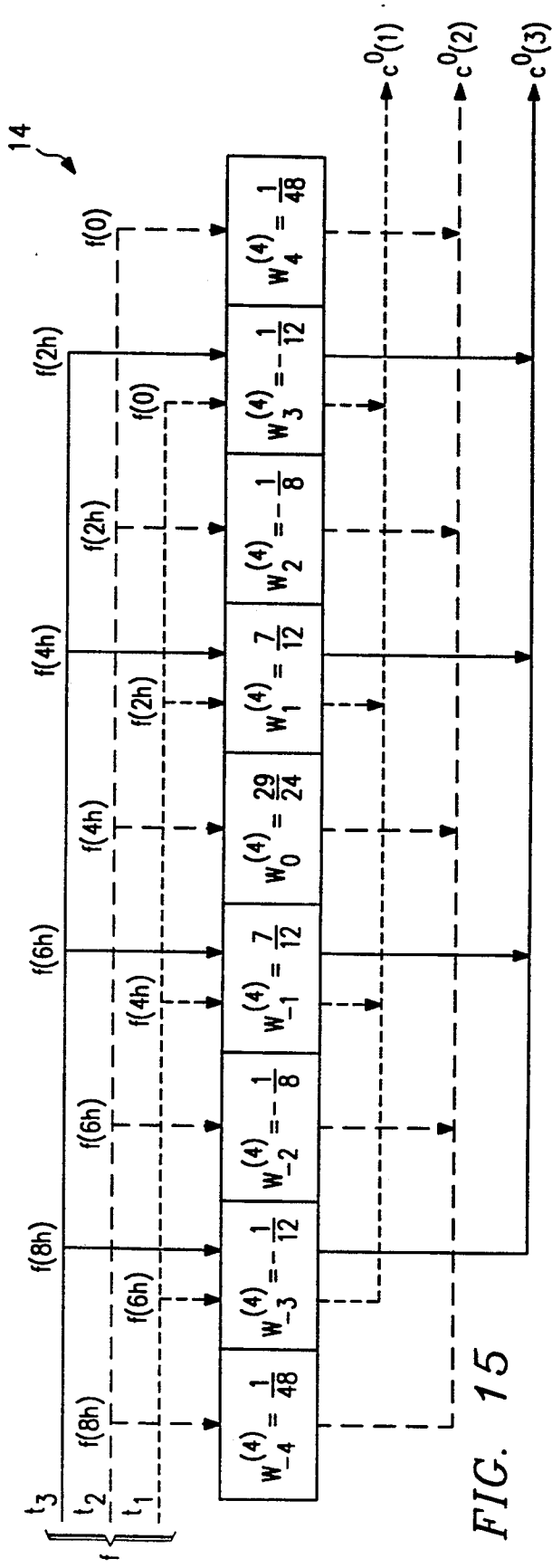
FIG. 15

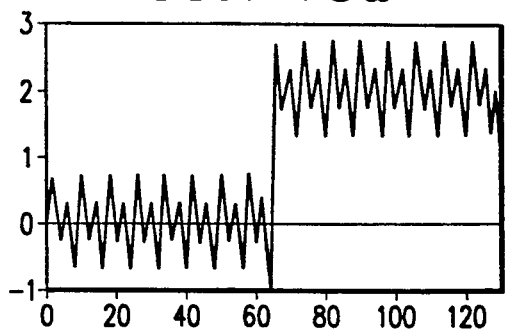
FIG. 13d
FIG. 13a
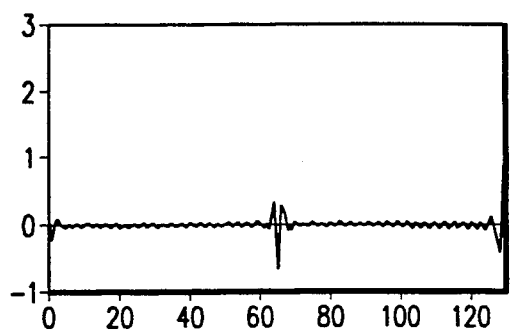
FIG. 13e
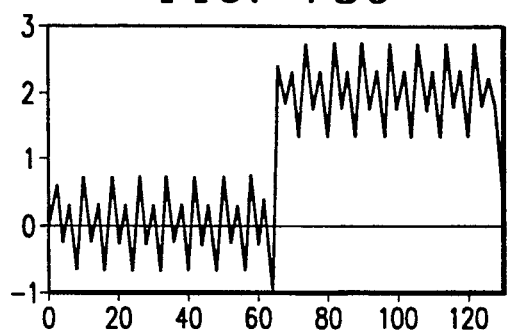
FIG. 13b
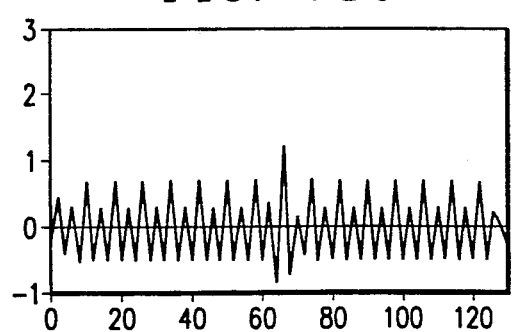
FIG. 13f
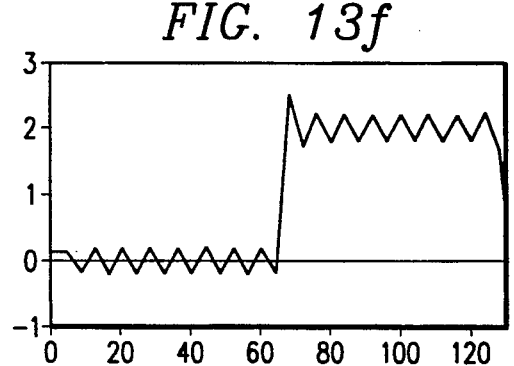
FIG. 13c
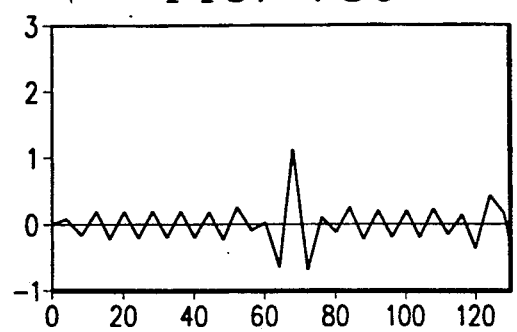
FIG. 13g
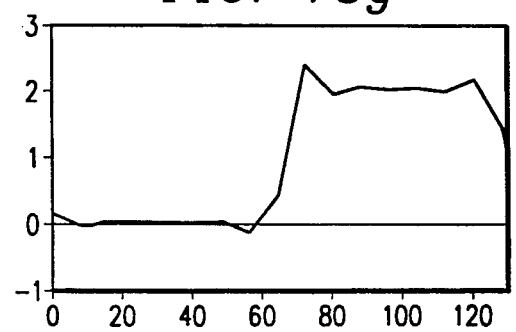

SPLINE-WAVELET SIGNAL ANALYZERS AND METHODS FOR PROCESSING SIGNALS

NOTICE: The U.S. Government has a paid-up license in this invention and the right in limited circumstances to require the patent owner to license others on reasonable terms as provided by the terms of one or more of the following contracts:

Department of the Army, U.S. Laboratory Command, Army Research Office, Contract Nos. DAAL03-87-K-0025 and DAAL03-90-G-0091; and National Science Foundation, Contract No. DMS-89-01345.

TECHNICAL FIELD OF THE INVENTION

The present invention relates in general to signal processing, and more particularly to methods and apparatus for processing a signal using splines and spline-wavelets thereof.

BACKGROUND OF THE INVENTION

While spline functions have been used very successfully for analyzing both exact and noisy data of signals, the technique of Fourier transformation has been the conventional tool for studying the corresponding spectral behavior in the frequency domain. Indeed, in many applications such as image and signal analyses, only spectral information can be observed. However, although the Fourier techniques are very powerful, there is a very serious deficiency of the integral Fourier representation, namely: information concerning the time-evolution of frequencies cannot be obtained with a Fourier transform. The formulation of the Fourier transform requires global information of the function in the time-domain, i.e., from the entire length of the signal in time.

This shortcoming has been observed by D. Gabor, (Gabor, D., "Theory of Communication", JIEE (London) 93 (1946), 429–457) who introduced a time and frequency localization method by applying the Gaussian function to "window" the Fourier integral. Other window functions have been studied since then, and this method is usually called the window Fourier transform or short-time Fourier transform (STFT). Nevertheless, there are still defects in all of the STFT methods, mainly due to very undesirable computational complexity when narrowing the window is required for good localization of signal characteristics and widening the window is required for yielding a more global picture.

The integral wavelet transform (IWT), on the other hand, has the capability of zooming in on short-lived high-frequency phenomena and zooming out for low-frequency observations. Hence, the IWT is suitable for a very wide variety of applications such as radar, sonar, acoustics, edge-detection, etc. This transform has its origin in seismic analysis and the first disclosure of it was in Grossman, A. and J. Morlet, "Decomposition of Hardy Functions Into Square Integrable Wavelets of Constant Shape," *SIAM J. Math. Anal.* 15 (1984), 723–736. It is based on the simple idea of dilation and translation of the window function which is known as the basic wavelet (B-wavelet)$\psi$. Dilation corresponds to the change of frequencies, and translation localizes time or position. In addition to being a window function like the STFT, the basic wavelet $\psi$ satisfies the condition of having zero mean. Hence, since it has somewhat concentrated mass, it behaves like on "small wave", and so the terminology of "wavelet", or "ondelette" in French, is quite appropriate. The zero-mean property of $\psi$, or equivalently the vanishing of its Fourier transform at the origin $\hat{\psi}(0)=0$, can be weakened a little to $\hat{\psi}(\omega)/|\omega|^{\frac{1}{2}}$ being in $L_2$, a space in which signals or images are finite. The idea and techniques of the IWT can be traced back to Calderon, A. P., "Intermediate Spaces and Interpolation, the Complex Method," *Studia Math.* 24 (1964), 113–190, which related to singular integral operators. An integral reproducing formula allows us to reconstruct the function from its IWT.

However, such a reconstruction requires global information of the IWT at all frequencies. If the basic wavelet $\psi$ is orthonormal (o.n.), and this means that $\{\psi(\bullet-n): n \epsilon zz\}$ is an o.n. family, then under very mild conditions on $\psi$, a "wavelet series" can also be used to recover the original function. This observation revolutionizes certain aspects of Harmonic Analysis, in that instead of the Fourier series, which represents periodic functions, the orthogonal series of wavelets represents functions defined on the real line. The importance of this representation is that with a good choice of the basic o.n. wavelet $\psi$, there is now a representation which localizes both time and frequency.

There are many o.n. wavelets in the literature. The oldest one is the Haar function which cannot be used to localize frequency. Later works which are very influential to the development of the subject of wavelets are the following: Stromberg, J. O., "A Modified Franklin System and Higher-Order Spline Systems of $\mathbb{R}^n$ As Unconditional Bases For Hardy Spaces," in *Conference in Harmonic Analysis in honor of Antoni Zygmund,* Vol. II, W. Beckner, et al. (ed.), Wadsworth Math Series, 1983, 475–493; Meyer, Y., "Principe d'Incertitude, Bases Hilbertiennes et Algebres d'Opera Teurs," *Seminaire Bourbaki,* No. 662, 1985–1986; Lemarié, P. G., "Ondelettes à Localisation Exponentielle," *Journal de Math. Pures et Appl.* 67 (1988), 227–236; and Battle, G., "A Block Spin Construction of Ondelettes Part I: Lemarié Functions," *Comm. Math Phys.* 110 (1987), 601–615. The o.n. wavelets $\psi$ which have the greatest impact to this subject are the compactly supported o.n. wavelets introduced in Daubechies, I., "Orthonormal Bases of Compactly Supported Wavelets," *Comm. Pure and Appl. Math.* 41 (1988), 909–996.

The inventors have found another approach to reconstruct a function from its IWT, again by a wavelet series. This wavelet $\psi$ confers a technical advantage in that it does not have to be o.n. as described above, but still gives the same orthogonal wavelet decomposition of the function. The idea is to introduce a dual wavelet $\overline{\psi}$ of $\psi$. The advantage of this approach is that it gives more freedom to construct wavelets with other desirable properties. Perhaps the most important advantage, at least for many applications to signal analysis, is the property of linear phase, which requires the wavelet to be symmetric or antisymmetric. Since compactly supported o.n. wavelets other than the Haar function cannot be symmetric or antisymmetric (see Daubechies, supra), the inventors give up orthogonality within the same scale-levels in order to construct compactly supported continuous wavelets with linear phase. The extra freedom also allows the inventors to give explicit expressions of the wavelets; and in fact, even compactly supported polynomial spline-wavelets with linear phases having very simple expressions were constructed by the inventors.

The applications of wavelets, whether o.n. or not, go far beyond the IWT and the recovery from IWT. The main reason is that very efficient algorithms, usually called pyramid algorithms, are available. Pyramid algorithms for o.n. wavelets were introduced in Mallat, S., "Multiresolutional Representations and Wavelets," Ph.D. thesis, Univ. of Pennsylvania, Philadelphia, 1988. The inventors derived the pyramid algorithms for nonorthogonal spline-wavelets. All these algorithms yield orthogonal wavelet decompositions and reconstructions in almost real-time. A wavelet decomposition separates and localizes the spectral information in different frequency bands (or octaves), and hence, filtering, detection, data reduction, enhancement, etc., can be easily implemented before applying the wavelet reconstruction algorithm. Both the decomposition and reconstruction algorithms use formulas that describe the intimate relationship between the wavelet of interest and the "spline" function that is used for approximation. The mathematical description of this relationship, called multiresolution analysis, was introduced in Meyer, Y., "Ondelettes et Fonctions Splines," Seminaire Equations aux Derivees Partielles, Centre de Mathematique, Ecole Polytechnique, Paris, France, December 1986) and by Mallat, supra.

There has been a long-felt need in the field for methods and apparatus that are useful for analyzing frequency information of signals and images by which phenomena can be localized, and which are sufficiently computationally simple that they can be performed almost in real time.

SUMMARY OF THE INVENTION

One aspect of the present invention is a signal analyzer which decomposes an input signal into splines and spline-wavelets using simple computational steps which therefore can be performed in almost real-time. The signal analyzer includes a receiver for receiving an analog signal, a sampler and digitizer for producing digital signal samples based on the input analog signal, and a spline coefficient generator. The spline coefficient generator includes digital circuitry for multiplying a plurality of predetermined stored scalar weights by respective ones of a string of the digitized signal samples. These weighted signal samples are then summed together in a moving average operation to derive a plurality of zero-level B-spline coefficients. The B-spline coefficients are multiplied in a second moving average operation by a plurality of constants $A_n$ to derive a plurality of first-level B-spline coefficients. The zero-level B-spline coefficients are multiplied by a plurality of constants $B_n$ in a third moving-average operation to derive a plurality of first-level wavelet coefficients. A signal processor can be used to process selected ones of the first level spline and wavelet coefficients in order to improve the signal. The first-level spline coefficients can in a like manner be used to derive second level spline and wavelet coefficients, the second level spline coefficients can be used to derive third level spline and wavelet coefficients, etc. until the desired order of decomposition resolution is achieved.

According to another aspect of the invention, the signal analyzer includes a spline generator that may be constructed with conventional electronic components. The spline generator has a memory for storing the digital elements of a spline precursor waveform. A selected string of the spline coefficients for the spline to be generated are multiplied by said elements of the spline precursor waveform, and are summed with portions of prior digital elements of spline precursor waveforms derived from prior spline coefficient strings to produce an intermediate sequence. This sequence is converted to an intermediate signal by a digital to analog (D/A) converter. The intermediate signal is integrated a number of times equal to one less than the order of splines sought to be generated. The intermediate signal also has to pass through an analog buffer a number of times equal to the order of spline sought to be generated. As integrated and buffered (m−1) times, where m is the order of spline sought to be generated, the resultant analog signal will be a spline of the original signal input into the analyzer.

According to a further aspect of the invention, a wavelet generator is provided that is in most respects similar to the spline generator, except that the digital elements of wavelet precursor waveform are stored instead of a spline precursor waveform.

The importance of this invention is that to generate any wavelet curve, only a waveform of step functions with finite length is needed as input. All the other known wavelets in the literature cannot be generated by this or any similar method.

The present invention's technical advantages mean that it has wide application to different fields of use. For example, it can be used as an image processor to remove noise or as a signal processor for the same reason. The processor of the invention can be used to detect major breaks which encode information in an otherwise noisy signal. The wavelets derived from the signal according to the invention, as representing audio octaves, may be selectively amplified and then reassembled for such uses as hearing aids and stereo equalizers. The all-band filtering characteristics of the apparatus according to the invention also makes it useful for spectroscopic analysis in chemical applications. The signal analyzer according to the present invention may also be used to recognize an event of punch-through of a machine drill, or of machine tool breakage. These applications and others result because the signal processor of the invention is sufficiently computationally simple that the signal can be processed almost in real time by a few arithmetic calculations, and can be built from off-the-shelf electronic components and a conventional signal processor. Further, the signal analyzer of the invention has the technical advantage of being able to provide good windowing and frequency event localization.

BRIEF DESCRIPTION OF THE DRAWINGS

Further aspects of the invention and their advantages may be discerned from the following detailed description when taken in conjunction with the drawings in which:

FIGS. 1a and 1b are graphs of the linear B-spline and linear B-wavelet (m=2);

FIGS. 2a and 2b are graphs of the cubic B-spline and cubic B-wavelet (m=4);

FIGS. 4a–4g are splines $F^0(t)$–$F^{-3}(t)$ and wavelets $G^{-1}(t)$–$G^{-3}(t)$ of a force signal, showing separation of high-frequency noise from the force signal;

FIGS. 9a–9d are schematic diagrams illustrating reconstruction of a star pattern;

FIGS. 13a–13g are graphs of an amplitude v. time signal and its splines and wavelets for k=−1, −2 and −3, illustrating localization of a signal edge that represents information;

FIG. 15 is a schematic diagram of a spline interpolator according to the invention;

DETAILED DESCRIPTION OF INVENTION

Multiresolution Analysis and the B-wavelets

Figure 3B:
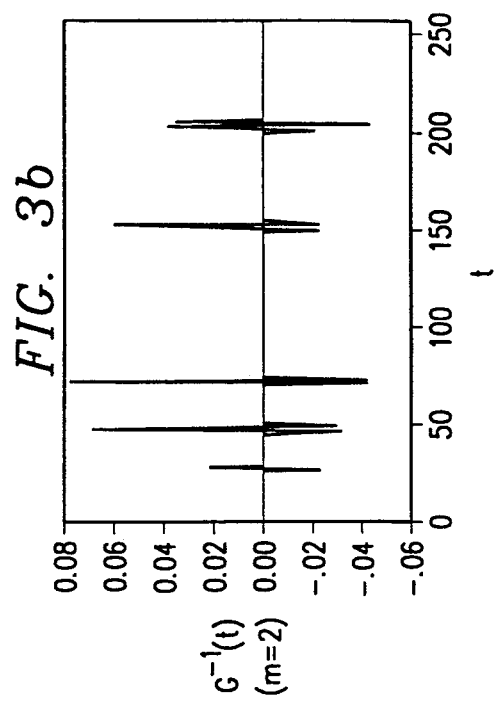
FIGS. 3a–3c are graphs of splines $F^0(t)$ and wavelets $(G^{-1}(t); m=2, m=4)$ of a radar signal, showing how locations of small radar echoes may be resolved in large sinusoidal noise.

Since all signals in nature contain a finite amount of energy, it is natural to represent these signals with energy limited functions. A signal F(t) is said to be in the energy-limited space $L_2$ if $$\int_{-\infty}^{\infty} |F(t)|^2 dt < \infty \quad (1)$$

The B-spline or basic spline functions, because of their compact supports, are functions in $L_2$. That is, beyond certain limits, the B-spline functions have a value of zero. Herein, the inventors will consider the class of signals which are representable by a B-spline series, and in particular, only the B-splines with integer knots will be described for simplicity and computational efficiency.

In the multiresolution analysis, the inventors are interested in those closed subspaces of $L_2$ which form a nested sequence:

$$(2) \ldots \subset V_{-3} \subset V_{-2} \subset V_{-1} \subset V_0 \subset V_1 \subset V_2 \subset V_3 \subset \ldots$$

The definition of $V_k$ is dictated by the relationship F(t)∈$V_k$ if and only if F(2t) ∈$V_{k+1}$. The subscripts in (2) indicate the level of resolution. Here $V_0$ is obtained from the cardinal spline space with integer knots of a desirable order, say m, by deleting all polynomials. If $\phi(t)$ is a B-spline that generates $V_0$ by superposition of all integer translates, the functional space expression in (2) implies that $\phi(t)$ can be expanded as a series of translates $\phi(2t−j)$. That is, $$\phi(2^0 t) = \sum_j p_j \phi(2^1 t - j) \quad (3)$$

where $\phi(2t)$ is in $V_1$. In fact, it is clear that $$p_j = 2^{-m+1} \binom{m}{j} \quad (4)$$

is a finite sequence, where $$\binom{m}{j}$$

denotes how many ways j elements may be selected from m elements. The superscript in (3) indicates that the function $\phi(2^1 t)$ is in the 1st level of resolution which is one level higher than that of $\phi^0(t)$. The inventors denote the basis function in the space $V_k$ by $$\phi_{k,j}(t) = \phi(2^k t - j), \ j \in \text{ZZ}, \quad (5)$$

where ZZ is the domain of integers.

Hence, (3) implies $$\phi_k(t) = \sum_j p_j \phi_{k+1,j}(t) \quad (6)$$

for arbitrary resolution levels k, and the multiresolution analysis requires that a basis function in the subspace $V_k$ must be expressible as a sum of integer translates of the basis function in $V_{k+1}$.

At this point, the inventors need to point out that the splines $\phi_{k,j}$=0,1, ... in $V_k$ are not required to be orthogonal to one another. This orthogonal property is not enforced in order to give explicit formulation of the B-wavelet (basic wavelet) $\psi$, so that $\psi$ and any finite wavelet series can be obtained by "integrating" a waveform of step functions with finite length, and so as to gain higher computational speed for the algorithms developed below so that they can be implemented in real-time, and so that the processing has linear phase.

Once the spline subspace $V_k$ is specified, its orthogonal complementary wavelet subspace $W_k$ in $V_{k+1}$ relative to $V_k$ is uniquely determined by $$V_{k+1} = V_k \oplus W_k \quad (7)$$

where the symbol $\oplus$ means $V_k \perp W_k$ and $V_k + W_k = V_{k+1}$. Eq. (7) is analogous to the Euclidean vector decomposition in which the normalized basis functions in $V_k$ and $W_k$ serve as the unit vectors in an orthogonal coordinate system. Any function represented in $V_{k+1}$ can be decomposed into components in $V_k$ and $W_k$. The basis functions in $V_k$ are $\phi_{k,j}$, the $2^k$ scale of the $m^{th}$ order B-spline $\phi$, and the ones in $W_k$ are the B-wavelets $\psi_{k,j}$ which are defined by $$\psi_{k,j} = \psi(2^k t - j). \tag{8}$$

through the $m^{th}$ order B-wavelet $$\psi(t) = \tag{9}$$

$$(\frac{1}{2}^{m-1}) \sum_{j=0}^{2m-2} (-1)^j \phi_{2m}(j+1) \sum_{l=0}^{m} (-1)^l \binom{m}{l} \phi_m(2t - j - 1)$$

where m is the order of the B-spline $\phi$.

Before proceeding any further, let's summarize the properties of the subspaces $V_k$ of $L_2$ for the multiresolution and wavelet analysis as follows:
(10a) ... $\subset V_{-3} \subset V_{-2} \subset V_{-1} \subset V_0 \subset V_1 \subset V_2 \subset V_3$ ...

$$V_{k+1} = V_k \oplus W_k \tag{10b}$$

It follows from Eqs. (10a) and (10b) that $$W_k \perp W_j, \forall k \neq j \tag{10c}$$

Hence, from Eqs. (10b) and (10c) the inventors obtain $$<\phi_{k,i}, \psi_{k,j}> = 0, \text{ZZ } k, i, j \epsilon \tag{11}$$

$$<\psi_{k,i}, \psi_{l,j}> = 0, \forall k \neq l \text{ and } i, j \epsilon ZZ \tag{12}$$

We want to emphasize two things here. The first is that Eq. (8) is an explicit expression of the B-wavelet of order m. Its definite relationship with the $m^{th}$ order B-spline enables us to compute the Fourier transform explicitly and to evaluate the windowing properties, the linear phase properties, and the filter characteristics of the B-wavelet. Secondly, the $m^{th}$ order B-wavelet $\psi(t)$ has compact support, namely $\psi(t) = 0$ for $t \notin [0, 2m-1]$. The inventors will demonstrate below that the compactness of the support of $\psi(t)$ enables the signal F(t) to be processed in close to real-time. The B-splines and the corresponding wavelets for m=2 and 4 are shown in FIGS. 1a–1b and 2a–2b respectively.

B-wavelets and the Integral Wavelet Transform

As explained above, although the Fourier transform $$\hat{f}(\omega) = \int_{-\infty}^{\infty} f(t) e^{-j\omega t} dt \tag{13}$$

has been used extensively in signal processing to yield the spectral domain information of the signal, it is inadequate to process signals whose spectra may change with time. For example, if the frequency of a signal is changed from $\omega_1$ to $\omega_2$ at the time $t_0$, the information from $\hat{f}(\omega)$ is not sufficient to identify the location of the change. In addition, the Fourier transform is not suitable for real-time signal processing because the computation of the spectrum requires global information of the signal, that is, information about the signal at all times from minus infinity to plus infinity. For this and other reasons, the Short-Time Fourier Transform (STFT) was developed in order to capture the spectral domain information of a signal in the neighborhood of a given time $t_0$. However, because the window functions for the STFT are functions with fixed window widths, STFT can only provide time-frequency localization of signal changes without distinguishing high and low frequency characteristics. A window function with controllable window width is a preferred choice for the processing of non-stationary signals.

The Integral Wavelet Transform (IWT) was introduced by Grossmann and Morlet (Grossmann, A., et al., "Continuous Wavelet Transform in Signal Analysis I & II," in manuscript) by using a window function of the form $w[(t-b)/a]$ such that its width can be controlled by changing the value of a. What is known as the zoom-in and zoom-out effect of the IWT corresponds to the change of the value a from large to small. The wavelet transform with respect to an arbitrary function g is formally defined as $$W_g f(b, a) = \frac{1}{\sqrt{a}} \int_{-\infty}^{\infty} f(t) g\left(\frac{t-b}{a}\right) dt \tag{14}$$

In particular, if a and b are chosen so that $a = 2^{-k}$ and $b = j2^{-k}$, the IWT of a function f(t) with respect to a B-wavelet is given by $$W_g f(j/2^k, 2^{-k}) = 2^{k/2} \int_{-\infty}^{\infty} f(t) \psi_{k,j}(t) dt. \tag{15}$$

Any B-wavelet or its dual (to be discussed below) can be used to serve as a variable window whose width is controlled by the choice of resolution level k. The center of the B-wavelet window is defined by $$t_o = \frac{\int_{-\infty}^{\infty} t |\psi(t)|^2 dt}{\int_{-\infty}^{\infty} |\psi(t)|^2 dt} \tag{16}$$

and the width of the window is defined by $2\Delta\psi$ where $$\Delta\psi = \left[ \frac{\int_{-\infty}^{\infty} (t - t_o)^2 \psi^2(t) dt}{\int_{-\infty}^{\infty} \psi^2(t) dt} \right]^{\frac{1}{2}} \tag{17}$$

is the standard deviation of the B-wavelet. For time and frequency localizations, the Fourier transform of the window function must also be a window function in the frequency domain. Hence, the center of $\hat{\psi}(\omega)$ is defined by $$\omega_o = \frac{\int_{0}^{\infty} \omega |\hat{\psi}(\omega)|^2 d\omega}{\int_{0}^{\infty} |\hat{\psi}(\omega)|^2 d\omega} \tag{18}$$

and the width of the frequency domain window is $2\Delta\hat{\psi}$ where $$\Delta\hat{\psi} = \left[\frac{\int_0^\infty (\omega-\omega_0)^2|\hat{\psi}^2(\omega)|^2 d\omega}{\int_0^\infty |\hat{\psi}(\omega)|^2 d\omega}\right] \quad (19)$$

The lower limits in the integrals in (18) and (19) are chosen to be 0 because only positive values of the frequency variables are of interest. The centers of the B-wavelet windows and the corresponding window width in the time and frequency domains are given in Table 1 below. In addition, the window widths of the "dual" of the wavelet, which will be discussed in the next section, are also included.

| Wavelet Class | Order | $t_0$ | $\Delta\psi_t$ | $W_o$ | $\Delta\psi_\omega$ | $\Delta\psi_t * \Delta\psi_\omega$ |
|---|---|---|---|---|---|---|
| B-wavelet | m = 2 | 1.5 | 0.389676 | 5.406062 | 2.493392 | 0.971715 |
| | m = 4 | 3.5 | 0.541927 | 5.164246 | 0.931564 | 0.504839 |
| Dual-wavelet | m = 2 | 1.5 | 0.456582 | 4.777924 | 2.350458 | 1.073178 |
| | m = 4 | 3.5 | 0.872983 | 4.172286 | 1.041214 | 0.908963 |

Figure 3C:
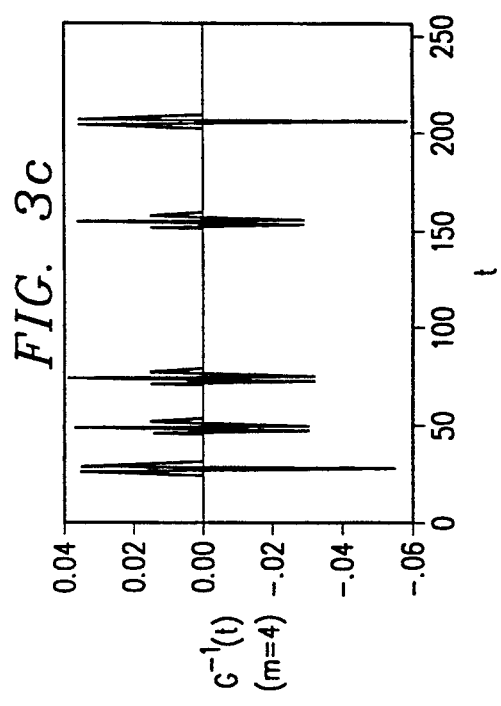
Figure 3A:
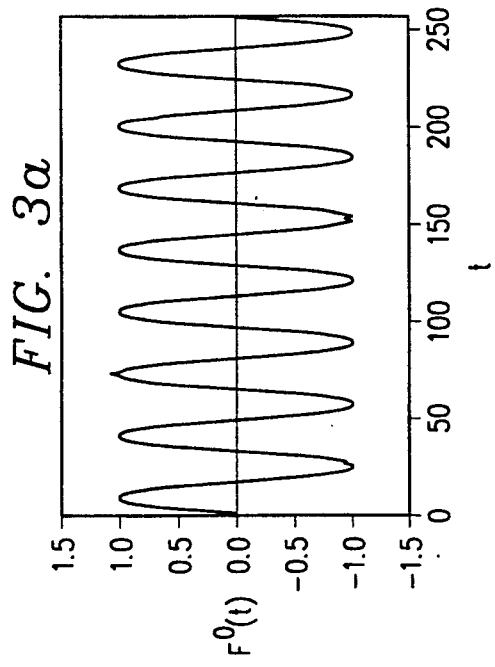

An example for resolving the location of a small pulse in large sinusoidal noise using B-wavelets at different scales is shown in FIGS. 3a–3c. Both the linear spline-wavelet (m=2) and the cubic spline-wavelet (m=2) are used in this example. The interval of uncertainty for the location of the pulse is proportional to the window width of the wavelet. The inventors remark here that the computation of the wavelet transforms shown in FIGS. 3b and 3c does not follow Eq. (15). Instead, a numerical algorithm has been used to avoid the computation of the inner product. The easily-computed algorithm will be explained in the following sections.

Wavelet Series and Dual Wavelets

Let an energy-limited signal f(t) be represented by a wavelet series in all resolutions as $$f(t) = \sum_k \sum_j d_{k,j} \psi_{k,j} \quad (20)$$

where the index k indicates the resolution level and $j/2^k$ is the discrete time location. In order to give an inner product representation for the wavelet coefficients $d_{k,j}$, the dual of the B-wavelet is introduced here. Let $\tilde{\psi}$ be the dual of the $m^{th}$ order B-wavelet $\psi$ in the sense that $$\int_{-\infty}^{\infty} \psi(t-j)\tilde{\psi}(t-l)dt = \delta_{j,l} \quad (21)$$

Using the same representation for $\tilde{\psi}_{k,j}(t)=\tilde{\psi}(2^k t-j)$ as $\psi_{k,j}(t)$ in (9), K(t,y) defined by $$K(t,y) = \sum_k \sum_j 2^k \tilde{\psi}_{k,j}(y)\psi_{k,j}(t) \quad (22)$$

in a reproducing kernel of $L_2$. That is, every function f(t) in $L_2$ can be recovered by $$\int_{-\infty}^{\infty} f(y)K(t,y)dy = f(t). \quad (23)$$

The coefficients $d_{k,j}$ in Eq. (20) are given in an inner product form $$d_{k,j} = 2^k <f,\tilde{\psi}_{k,j}>. \quad (24)$$

We note that the dual wavelet defined through Eq. (21) is utilized in Eq. (24) to obtain the wavelet coefficients. The dual of the B-wavelet $\psi$ is explicitly expressed as $$\tilde{\psi}(t) = \Sigma (-2)^{-n+1} a_j L_{2n}^{(n)}(2t - 1 - 2n - 2j) \quad (25)$$

where $\{a_j\}$, listed in Table 2 set forth below, is the coefficient sequence in the fundamental interpolatory spline $$L_{2m}(t) = \Sigma a_j \phi_{2m}(t + m - j) \quad (26)$$

defined uniquely by the interpolation conditions:

$$L_{2m}(k) = \delta_{k,0}, \quad k \in \mathbb{Z}. \quad (27)$$

TABLE 2

| m | 2 | 3 | 4 |
|---|---|---|---|
| $a_0$ | 0.288675134600 | 0.023684757690 | 0.000985066049 |
| $a_{\pm 1}$ | −0.077350269180 | −0.011014412280 | −0.000613302083 |
| $a_{\pm 2}$ | 0.020725942160 | 0.004777715592 | 0.000338880741 |
| $a_{\pm 3}$ | −0.005553499463 | −0.002058682729 | −0.000182694807 |
| $a_{\pm 4}$ | 0.001488055696 | 0.000886483372 | 0.000097952106 |
| $a_{\pm 5}$ | −0.000398723322 | −0.000381700702 | −0.000052451350 |
| $a_{\pm 6}$ | 0.000106837529 | 0.000164351034 | 0.000028078572 |
| $a_{\pm 7}$ | −0.000028627047 | −0.000070765509 | −0.000015030203 |
| $a_{\pm 8}$ | 0.000007670593 | 0.000030469884 | 0.000008045409 |
| $a_{\pm 9}$ | −0.000002055329 | −0.000013119581 | −0.000004306555 |
| $a_{\pm 10}$ | 0.000000550724 | 0.000005648968 | 0.000002305215 |

Since $$2^{(k/2)} <f,\tilde{\psi}_{(k,j)}> = 2^{(k/2)} \int_{-\infty}^{\infty} f(t)\tilde{\psi}\frac{t-j2^{-k}}{2^{-k}} dt, \quad (28)$$

the inner product in Eq. (24) is the $2^{k/2}$ multiple of the IWT of f(t) with respect to the basic wavelet $\tilde{\psi}(t)$ evaluated at time $t=j/2^k$ and at the $k^{th}$ resolution. The coefficients $d_{k,j}$ are written in terms of IWT of f(t) respect to $\tilde{\psi}(t)$ as $$d_{k,j} = 2^{(k/2)} W_{\tilde{\psi}} f(j 2^{-k}, 2^{-k}). \quad (29)$$

The algorithm for decomposition will next be given for computing these coefficients without evaluation of the inner product in Eq. (29).

Decomposition and Reconstruction Algorithms

For real-time signal processing, the system should begin to process as soon as the signal arrives at its input port. Algorithms involving the evaluation of inner products similar to Eq. (29) are inefficient because they must wait for the arrival of the complete signal. Two algorithms based on simple moving average operations have been developed by the inventors to process a real-time signal using B-wavelets.

stage of decomposition, the spline and wavelet coefficients $c_{k,j}$ and $d_{k,j}$ are expressed in terms of $c_{k+1,j}$. These sequences can be computed from Eq. (10b) in the form of $$\phi(2x - l) = \sum_{n \in ZZ} a_{l-2n}\phi(x - n) + \sum_{n \in ZZ} b_{l-2n}\psi(x - n) \tag{34}$$

for all $l \in ZZ$. The z-transform is used in the computation and the will not be given here. Instead, numerical values of the sequences are tabulated in Table 3 below for $m=2$ and 4.

TABLE 3

| n | m = 2 | | m = 4 | |
|---|---|---|---|---|
| | $a_n$ | $b_n$ | $a_n$ | $b_n$ |
| 1 | 0.683012701892 | | | |
| 2 | 0.316987298108 | 0.866025403784 | 0.893162856300 | |
| 3 | −0.116025403784 | −0.316987298108 | 0.400680825500 | |
| 4 | −0.084936490539 | −0.232050807569 | −0.282211870800 | |
| 5 | 0.031088913246 | 0.084936490539 | −0.232924626100 | 1.475394520000 |
| 6 | 0.022758664048 | 0.062177826491 | 0.129083571200 | −0.468422596600 |
| 7 | −0.008330249198 | −0.022758664047 | 0.126457446400 | −0.742097698500 |
| 8 | −0.006098165652 | −0.016660498395 | −0.066420837390 | 0.372036400600 |
| 9 | 0.002232083545 | 0.006098165652 | −0.067903608500 | 0.387652501400 |
| 10 | 0.001633998562 | 0.004464167091 | 0.035226101680 | −0.200253531900 |
| 11 | −0.000598084983 | −0.001633998561 | 0.036373586990 | −0.207415172900 |
| 12 | −0.000437828595 | −0.001196169967 | −0.018815686620 | 0.107201949400 |
| 13 | 0.000160256388 | 0.000437828595 | −0.019473269360 | 0.111024481400 |
| 14 | 0.000117315818 | 0.000320512777 | 0.010066747520 | −0.057383198530 |
| 15 | −0.000042940569 | −0.000117315818 | 0.010424052190 | −0.059429224930 |
| 16 | −0.000031434679 | −0.000085881139 | −0.005387929819 | 0.030716104080 |
| 17 | 0.000011505891 | 0.000031434678 | −0.005579839208 | 0.031811301050 |
| 18 | 0.000008422897 | 0.000023011782 | 0.002883979478 | −0.016441729430 |
| 19 | −0.000003082990 | −0.000008422897 | 0.002986784626 | −0.017027966930 |
| 20 | −0.000002256905 | −0.000006165980 | −0.001543728719 | 0.008800936013 |
| 21 | 0.000000826079 | 0.0000022569054 | −0.001598768083 | 0.009114737475 |

The purpose of the decomposition algorithm is to separate a signal into many orthogonal components so that $$f(t) = f_0(t) = g_{-1}(t) + g_{-2}(t) + \ldots + g_{-n}(t) + f_{-n}(t) \tag{30}$$

where $$f_k(t) = \sum_j c_{k,j}\phi(2^k t - j) \tag{31}$$

is a spline series and $$g_k(t) = \sum_j d_{k,j}\psi(2^k t - j) \tag{32}$$

is a wavelet series. Schematically, the decomposition process can be represented by

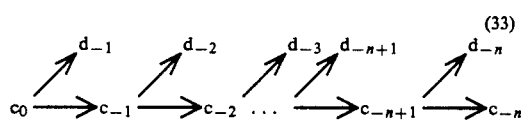

(33)

Here, the inventors use the 0th level as the highest level only for convenience. In practice, it should be the Nth level where N is sufficiently large for good representation of f(t) as a B-spline series.

Although the wavelet series is the desired end result, the spline series must also be computed as the intermediate step for the next decomposition process. Two $L_2$ sequences $\{a_n\}$ and $\{b_n\}$ are needed so that for each Explicitly, $c_{k,j}$ and $d_{k,j}$ are obtained from $c_{k+1,j}$ by $$c_{kj} = \sum_n a_{n-2j} c_{k+1,n} \tag{35}$$

$$d_{kj} = \sum_n b_{n-2j} c_{k+1,n} \tag{36}$$

In this manner, a signal is decomposed into many orthogonal components so that each component represents a portion of the original signal at a given resolution level. Another interpretation is that each component represents the portion of the signal energy in that particular frequency band.

Figure 4B:
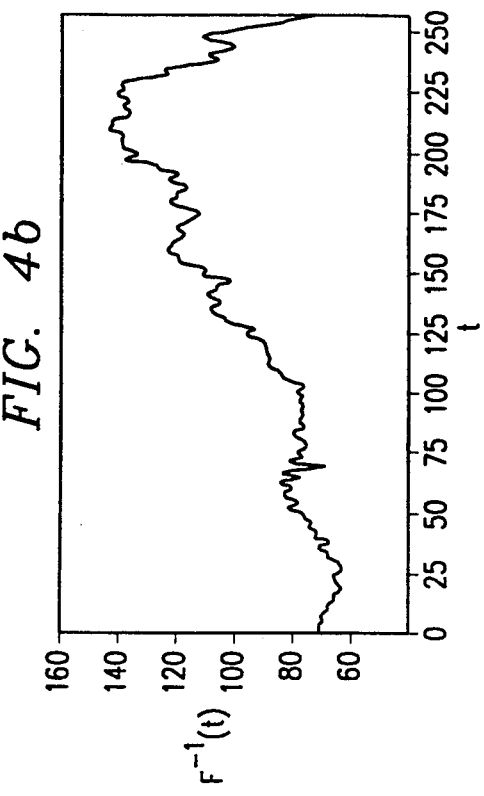
Figure 4D:
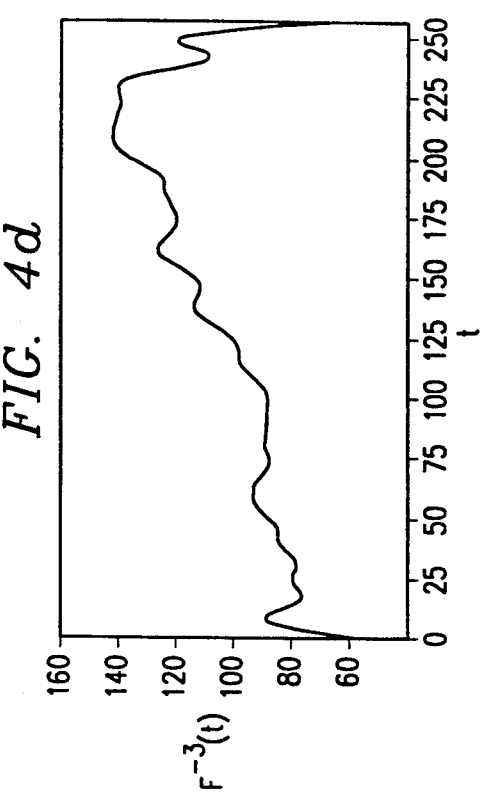
Figure 4A:
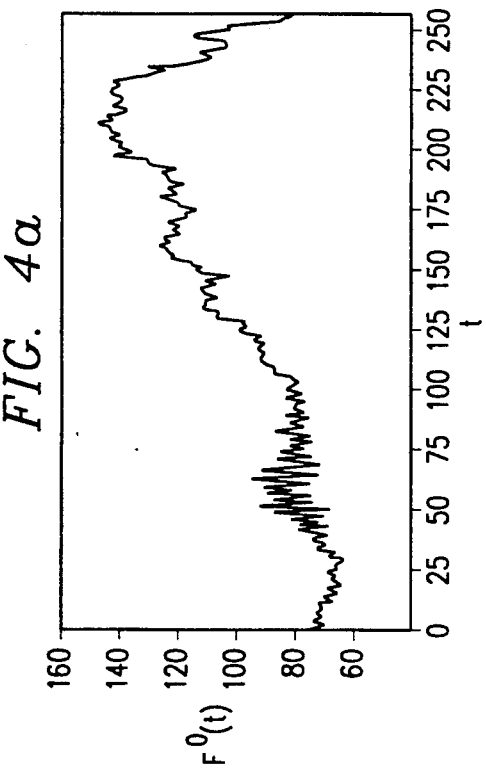
Figure 4C:
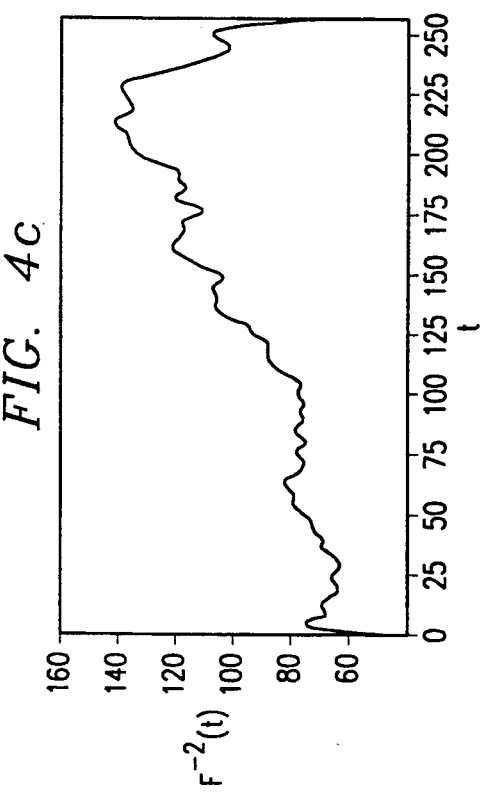
Figure 5E:
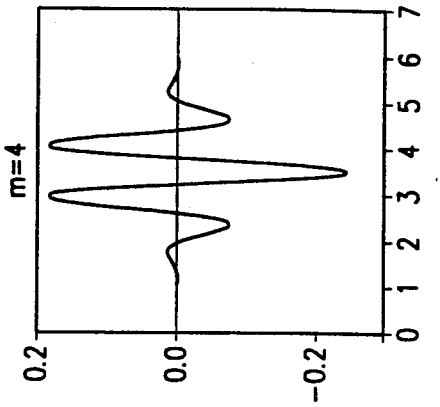
FIGS. 5a–5f are graphs of B-wavelets for m=2, 3 and 4, and the magnitude of their corresponding Fourier transforms.
Figure 5C:
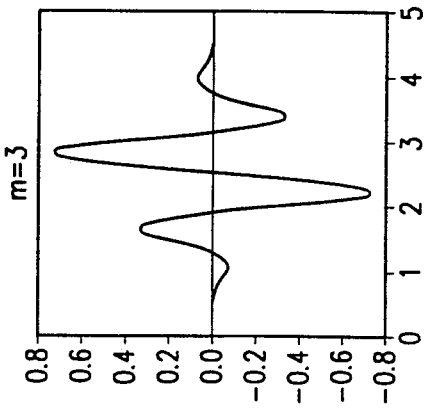
Figure 5A:
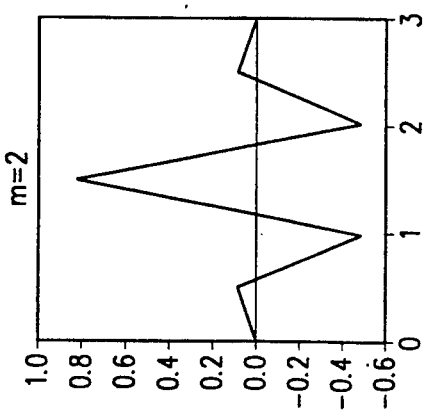
Figure 5F:
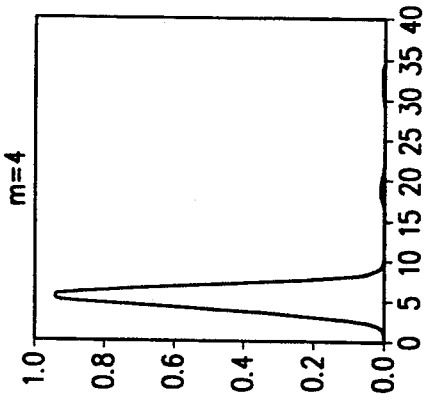
Figure 5D:
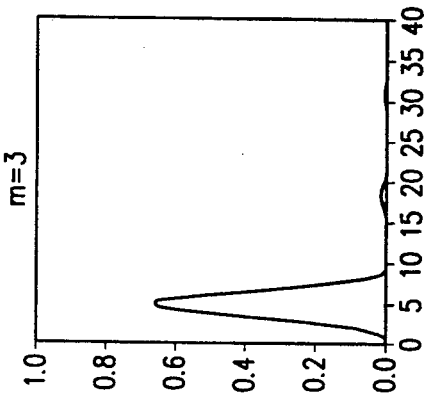
Figure 5B:
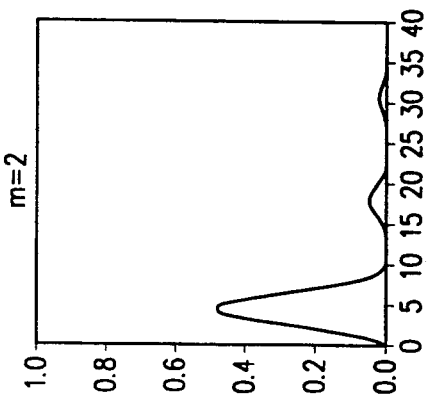
Figure 5K:
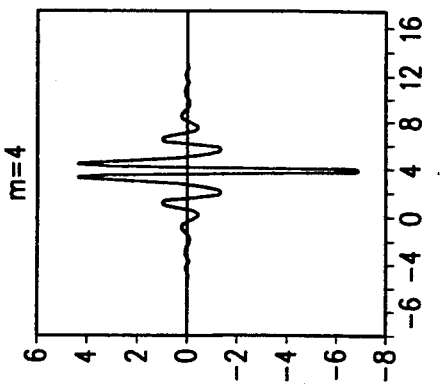
FIGS. 5g–5l are graphs of dual-wavelets for m=2, 3, 4, and the magnitudes of their corresponding Fourier transforms.
Figure 5I:
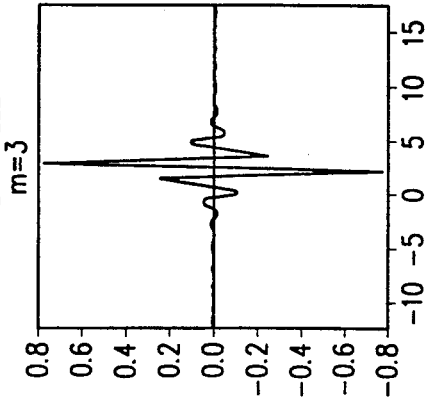
Figure 5G:
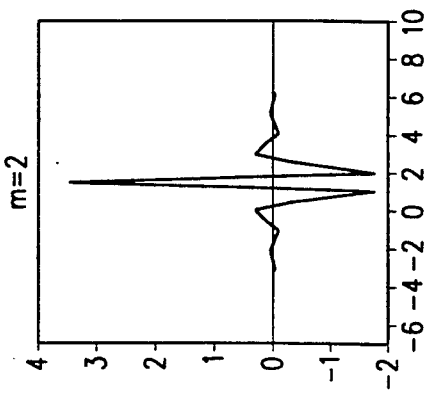
Figure 5L:
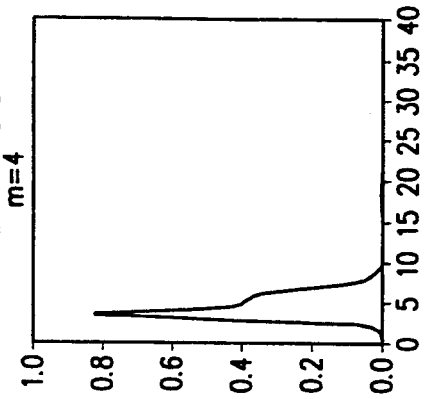
Figure 5J:
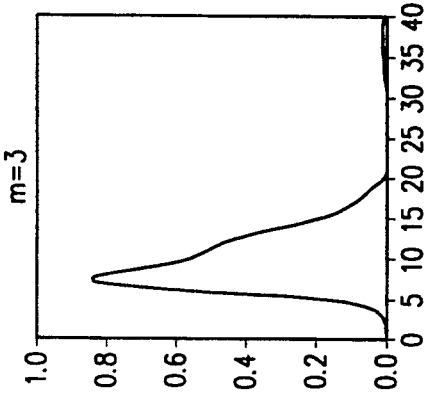
Figure 5H:
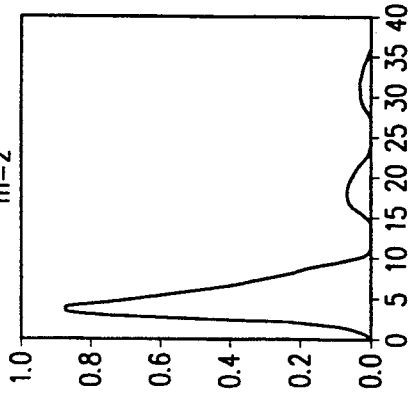

An example is shown in FIGS. 4a–d where the pressure signal of a drill-press is denoted $F^0(t)$. The zero-level spline shown in FIG. 4a is decomposed into several components of different resolution so that the noise due to the vibration of the drill-press table and the force advancing the drill-bit can be separated clearly. Note in particular the smoothness of the third-order spline $F^{-3}(t)$ in FIG. 4d. The first and second order splines are shown in FIGS. 4b and 4c, respectively, while the first through third-order wavelets $G^{-1}(t)$–$G^{-2}(t)$ are shown in FIGS. 4e–4g.

Each signal component can be selectively processed in the time domain. These processed components can be recombined to form the processed signal $f_p(t)$. Assuming the coefficients $c_{-k,n}$ and $d_{-k,n}$ have been processed to become $c^*_{-k,n}$ and $d^*_{-k,n}$ respectively, the reconstruction algorithm is given by $$c_{k+1j}* = \sum_n p^2_{j-2n}c_{k,n}* + q_{j-2n}d_{k,n}* \qquad (37)$$

where the sequences $\{p_n\}$ and $\{q_n\}$ are the two-scale sequences in $$\phi(t) = \sum_n p_n \phi(2t - n) \qquad (38)$$

$$\psi(t) = \sum_n q_n \phi(2t - n) \qquad (39)$$

The reconstruction process is shown in the following schematic diagram.

(40)

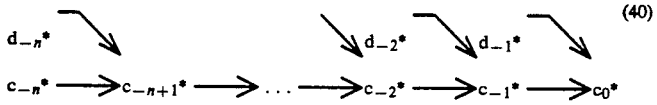

We remark here that the sequences $\{a_n\}$ and $\{b_n\}$ are infinite sequences. However, the amplitudes of the coefficients decay exponentially fast so that only a few coefficients are needed for the computations. By "truncating" the sequences $\{a_n\}$ and $\{b_n\}$, and using the finite nature of the sequences $\{p_n\}$ and $\{q_n\}$, both the decomposition and reconstruction algorithms operate on the signal as two finite impulse response filters. In fact, no more than forty coefficients are needed for any one of these sequences for sufficient accuracy. The exact method and effects of "truncation" will be examined below. The sequences $\{p_n\}$ and $\{q_n\}$ are given in Table 4.

TABLE 4

| n | m = 2 | | m = 4 | |
|---|---|---|---|---|
|   | $P_n$ | $Q_n$ | $P_n$ | $Q_n$ |
| 0 | ½ | 1/12 | ⅛ | ⅛! |
| 1 | 1 | −½ | 4/8 | −124/8! |
| 2 | ½ | 5/6 | 6/8 | 1677/8! |
| 3 |   | −½ | 4/8 | −7904/8! |
| 4 |   | 1/12 | ⅛ | 18482/8! |
| 5 |   |   |   | −24264/8! |
| 6 |   |   |   | 18482/8! |
| 7 |   |   |   | −7904/8! |
| 8 |   |   |   | 1677/8! |
| 9 |   |   |   | −124/8! |
| 10|   |   |   | ⅛! |

Linear Phase Characteristics of Spline-wavelets

In a signal processing system, the ability to preserve the relative phase of the frequency components of a signal is an important measure of the quality of the system. The linearity of the phase of a system prevents distortion at the output. A system with a generalized linear phase characteristic causes a constant phase delay at the output which is acceptable in most signal processing applications. A linear system is said to have a generalized linear phase characteristic if its Fourier transform has the representation $$\hat{f}(\omega) = A(\omega)e^{j(a\omega+b)} \qquad (41)$$

where $A(\omega)$ is real-valued, and a and b are real constants. It is said to have linear phase if, in addition, $$A(\omega) = |\hat{f}(\omega)| \text{ and } e^{jb} = \pm 1. \qquad (42)$$

Similarly, a real-valued sequence $\{F_n\}$ is said to have generalized linear phase if its discrete Fourier transform (or Fourier Series) $F(\omega)$ has the form of Eq. (41); and said to have linear phase if Eq. (42) holds true for $F(\omega)$. A system has generalized linear phase if and only if the impulse response of the system is symmetric or antisymmetric.

The Fourier transforms of the $m^{th}$ order B-spline and B-wavelet are given by $$\hat{\phi}(\omega) = \left(\frac{\sin(\omega/2)}{\omega/2}\right)^m e^{-jm\omega/2} \qquad (43)$$

$$\hat{\psi}_m(\omega) = \frac{1}{(2m-1)!}\left(\frac{4}{\omega}\right)^m |(\sin \omega/4)^{2m} \frac{\pi}{2m-1} (-e^{-j\omega/2} |e^{j[(-m+\frac{1}{2})\omega + (3m-2/2)\pi]} \qquad (44)$$

where $L_{2m-1}$ is the Euler - Frobenius polynomial.

Since the compactly supported B-wavelets are all symmetric or antisymmetric depending on the order of the B-spline, they all have at least the generalized linear phase characteristic. The dual wavelets, although globally supported, also have the same property. Hence, all of $\phi_m, \psi_m, \bar{\phi}_m$ and $\bar{\psi}_m$ have generalized linear phases for all m, and have linear phase for all even m. For this reason, even-order polynomial splines and wavelets are preferable for signal processing. The compact supported B-wavelets, their duals, and the corresponding Fourier transforms for m=2,3,4 are shown in FIGS. 5a–5l.

The above-described decomposition and reconstruction algorithms process signals in the time domain. The wavelet series representation of a signal in Eq. 21 requires the computations of the spline and wavelet coefficients in Eqs. 32 and 33. In order for the entire system to have linear phase, the sequences $\{a_n\}, \{b_n\}, \{p_n\}, \{q_n\}$ must also have linear phases. Since the sequences $\{p_n\}, \{q_n\}$ are symmetric or antisymmetric finite sequences, their (generalized) linear phase property is assured.

The $\{a_n\}$ and $\{b_n\}$ are infinite sequences which require truncation for real-time processing. If they are truncated in such a way that they have symmetry or antisymmetry, they also have generalized linear phases. In fact, the net phase change of a single stage of decomposition-reconstruction process has been calculated to be zero because the transfer function of the system becomes a real constant.

Spline-wavelets as Bandpass Filters

In previous sections, the B-wavelets have been shown to have good windowing characteristics for good localization in the time and frequency domain. In addition, the linear phase characteristic of the wavelets and of the algorithms have also been demonstrated. Because the algorithms decompose the original signal into components at different resolution levels which may be viewed as different frequency bands, the B-wavelet at each resolution level can be considered as the impulse response of a bandpass filter with its bandwidth corresponding to that resolution. The multiband characteristic of the wavelet decomposition can be seen in FIGS. 4a–4g. The first sidelobe of the transforms of the wavelets are computed in dB and tabulated in Table 5.

TABLE 5

| m | B-wavelet | Dual-wavelet |
|---|-----------|--------------|
| 2 | −45 | −53 |
| 3 | −71 | −81 |
| 4 | −94 | −107 |

Figure 6A:
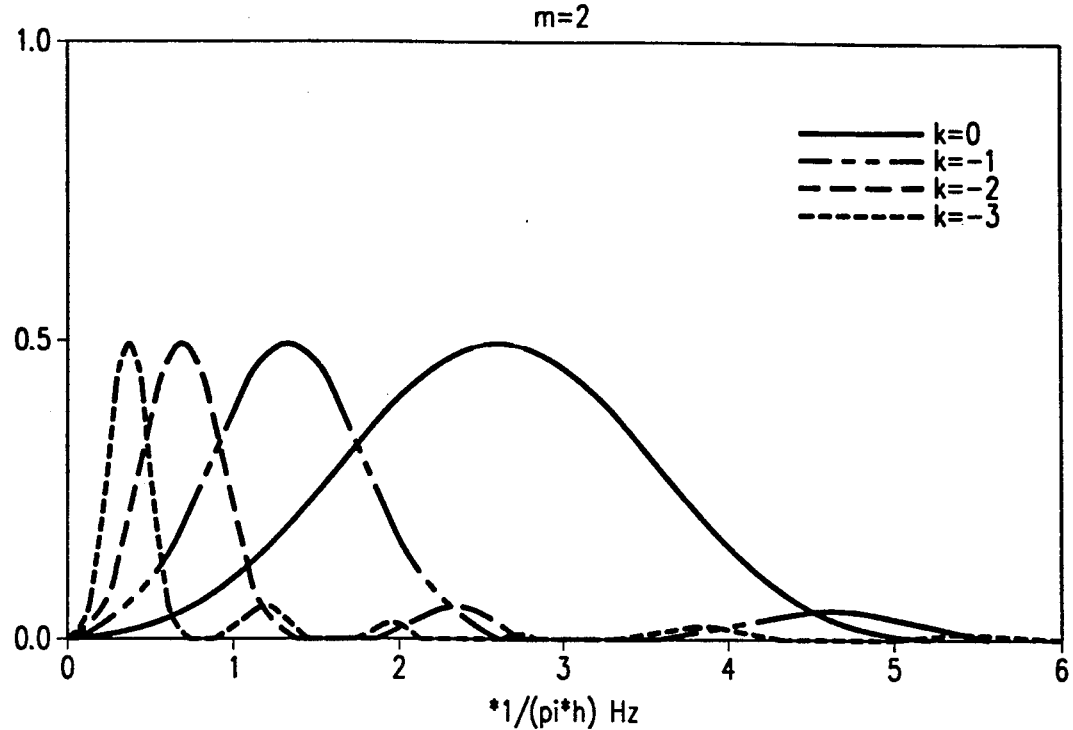
FIGS. 6a and 6b are respective graphs of frequency v. amplitude of the bandpass filter characteristics of linear and cubic B-wavelets.
Figure 6B:
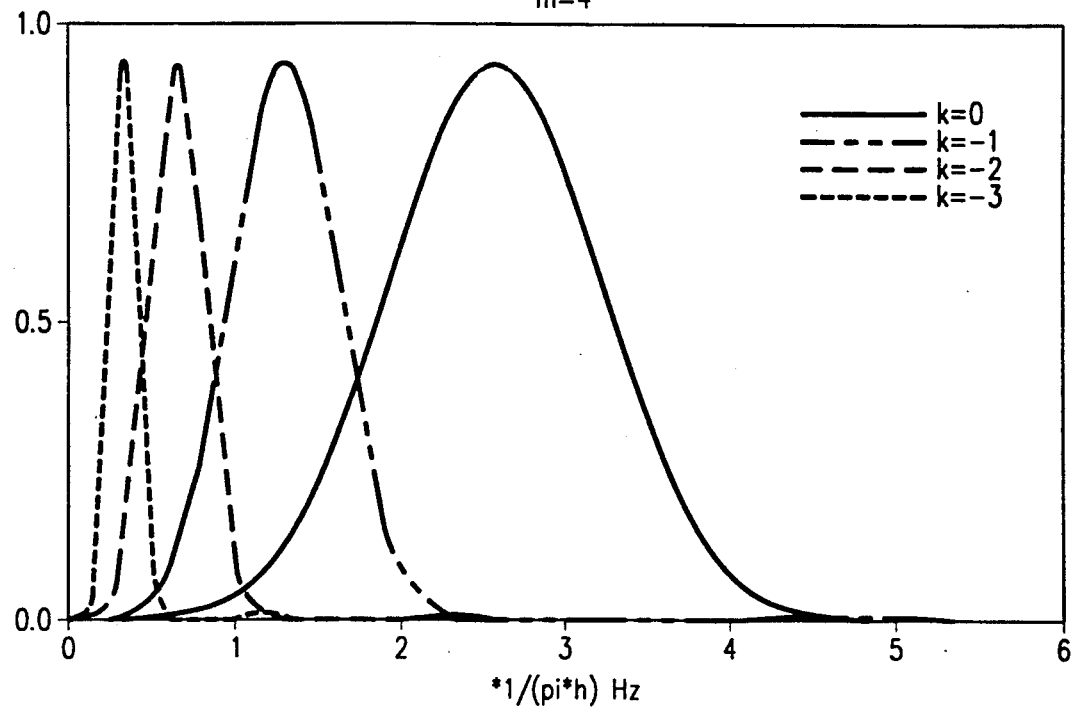
Figure 7A:
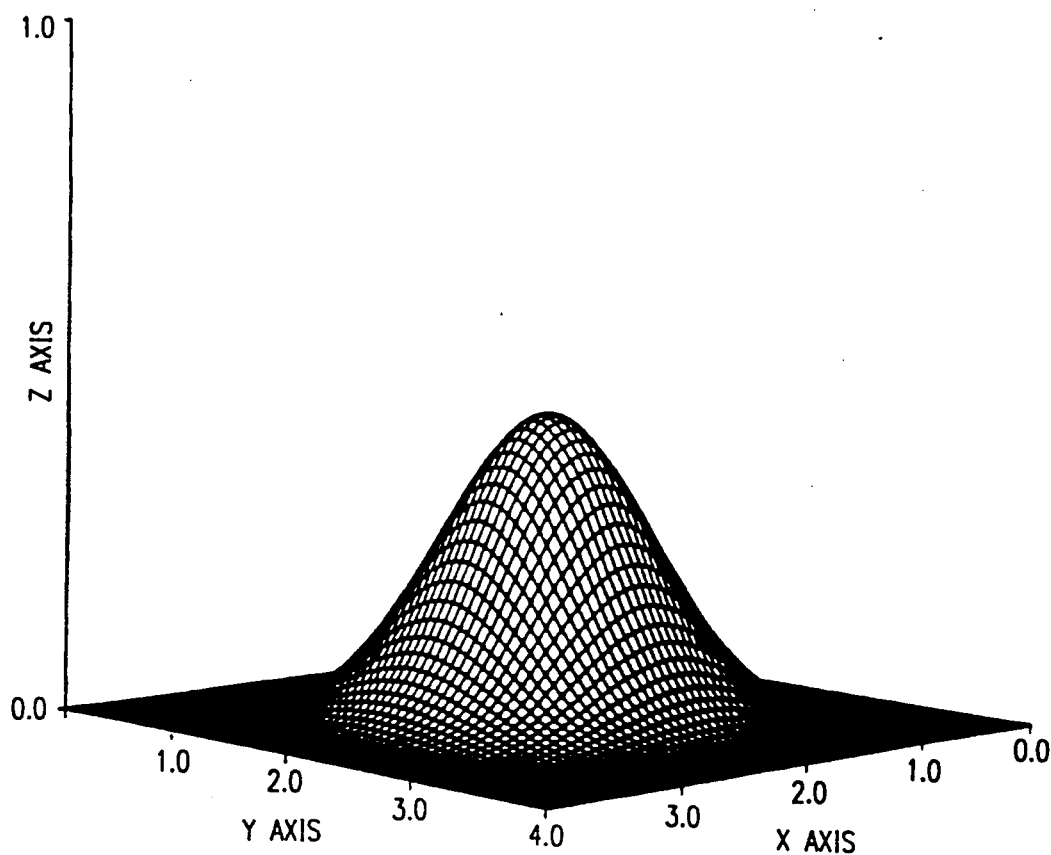
FIG. 7a is a graph of a tensor product B-spline $\Phi^0$.
Figure 7B:
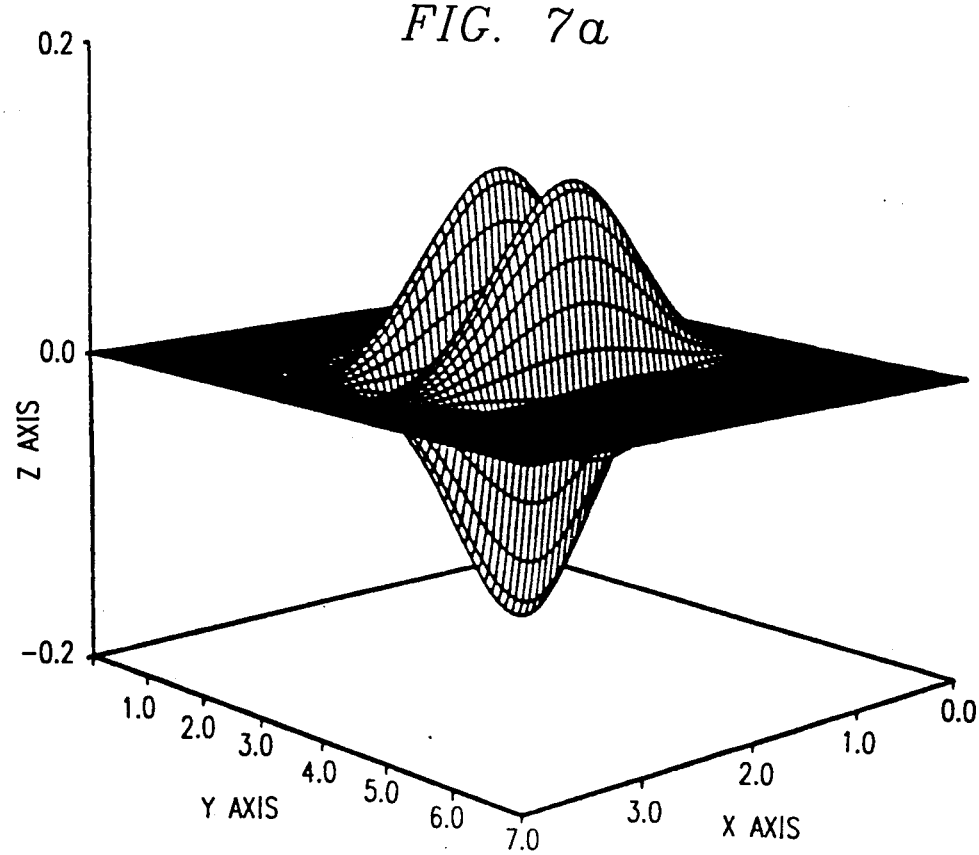
FIG. 7b is a graph of a tensor product B-wavelet $\Psi^1$.
Figure 7C:
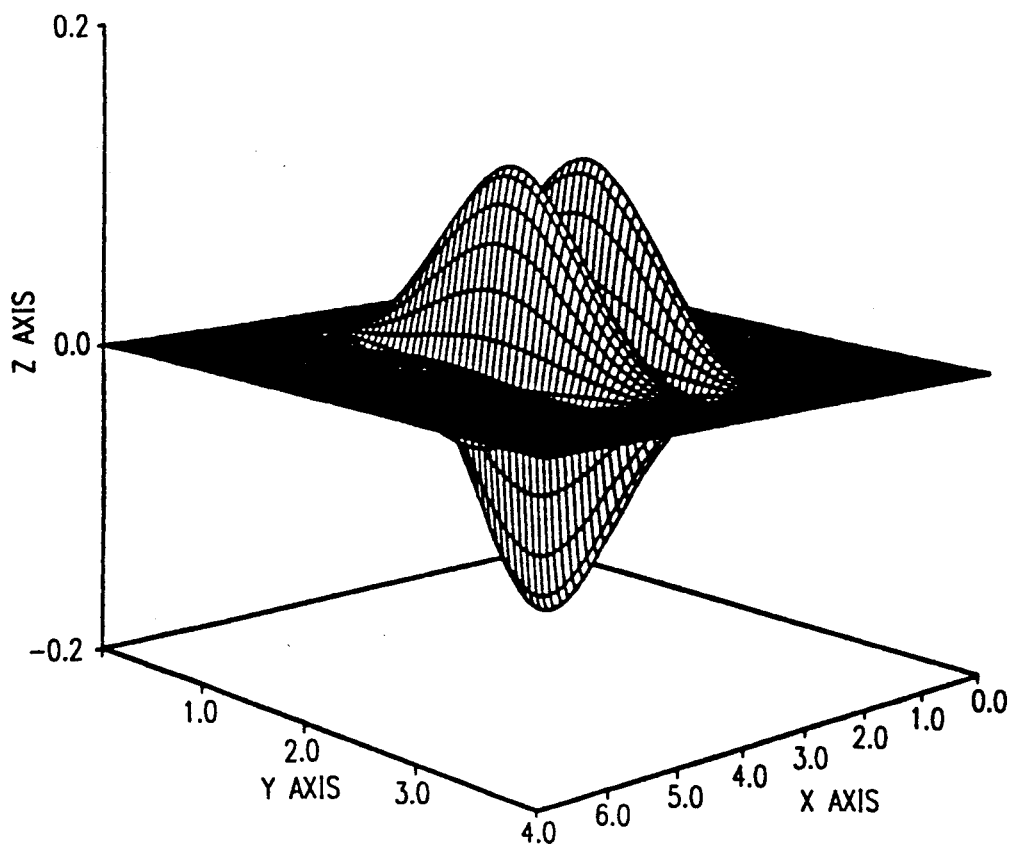
FIG. 7c is a graph of a tensor product B-wavelet $\Psi^2$.
Figure 7D:
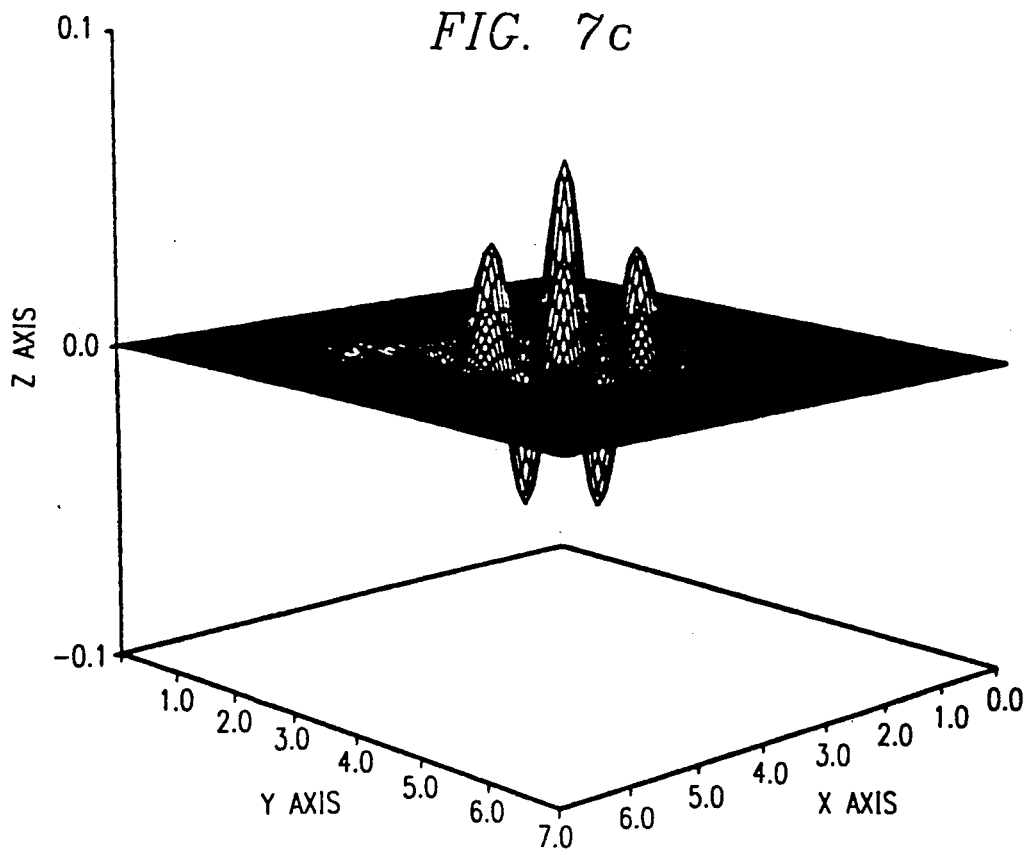
FIG. 7d is a graph of a tensor product B-wavelet $\Psi^3$.

FIGS. 6a and 6b are graphs of the bandwidths and center frequencies for linear (m=2) and cubic (m=4) bandpass filters. They show that as the resolution goes higher, the bandwidth becomes wider. However, the quality factor Q of the filter remains constant for all resolutions. Hence, the decomposition process is equivalent to filtering the signal with a constant Q multiband filter bank as pointed out in Vetterli, M., and Herley, C., "Wavelets and Filter Banks: Theory and Design", *Report CU/CTR/TR* 206/90/36, Center for Telecommunication Research, Department of Electrical Engineering, Columbia University, New York, N.Y. (1990). However, the decomposition algorithm of the invention gives a much more efficient way to accomplish the filtering while at the same time preserving the phase information in addition to providing the time localization required for processing of nonstationary signals. The fact that $$\sum_{K \in ZZ} \hat{\psi}_K(\omega) \hat{\tilde{\psi}}_K(\omega) = 1 \quad (45)$$

means the entire decomposition process is an all-pass filter.

Truncation of Global Sequences For Real-Time Processing

We have indicated above that the sequences $\{a_n\}$ and $\{b_n\}$ are infinite. The sequence $\{a_n\}$ is needed for computing the coefficients $c_{k,j}$ so that they wavelet coefficients $d_{k-1,j}$ for the next lower resolution level can be obtained. For real-time processing, they should be truncated to become symmetric or antisymmetric sequences with respect to their points of symmetry in order to retain their linear phase characteristics. In addition, since the truncation of $\{a_n\}$ directly influences the errors resulting from the computation of $c_{k,j}$ and $d_{k,j}$, it is reasonable to measure the total energy error due to the truncation of $\{a_n\}$.

The infinite sums A and B of the respective sequences $\{a_n\}$ and $\{b_n\}$ are $$A = \sum_{n \in ZZ} a_n = 1 \text{ and } B = \sum_{n \in ZZ} b_n = 0. \quad (46)$$

If the partial sums of the sequences after truncation are A' and B' so that $$A' = \sum_{n=-M}^{N} a_n \text{ and } B' = \sum_{n=-M}^{N} b_n \quad (47)$$

where M and N are chosen to form finite symmetric or antisymmetric sequences, our numerical experiments show that the order of the absolute difference $|1-A'|$ corresponds to the order of the error E in terms of the signal energy $$E = \left( \sum_{j=-M}^{N} (c_{k,j} - \bar{c}_{k,j})^2 / \sum_{j=-M}^{N} c_{k,j}^2 \right)^{\frac{1}{2}}. \quad (48)$$

An upper bound of this truncation error has been determined based on a one-level decomposition and reconstruction process. In particular, if we let $N=(M+N/2+1)$ be an integer, then the upper bound of the truncation error $E_m$ is given by $$E_m = A_m (B_m)^{N-(3m-2)/2} \quad (49)$$

where $A_m$ and $B_m$ are constants for a given order m of the splines. The numerical values of the constants are listed in Table 6 for m=2,3, and 4. A numerical example on the truncation error using the cubic B-wavelet is shown in Table 7.

TABLE 6

| m | $A_m$ | $B_m$ |
|---|-------|-------|
| 2 | 2.732050807570 | 0.267949192431 |
| 3 | 4.326911553411 | 0.430575347143 |
| 4 | 7.837374678512 | 0.535280430796 |

TABLE 7

| n | 19 | 17 | 5 | 13 |
|---|-----|-----|-----|-----|
| error | 0.000409 | 0.002191 | 0.007648 | 0.014288 |
| upper bound | 0.001243 | 0.004337 | 0.015135 | 0.052823 |

The results agree favorably with the predicted values. Preferably, the truncation of the coefficient sequences should be made in such a way that the quantity $|1-A'|$ decreases toward zero as the number of terms is increased. Due to the oscillatory nature of the coefficients, the partial sum of the sequences may have to increase by four additional terms at a time to reduce the error.

Spline-Wavelets For Two-Dimensional Signal Processing

The algorithms developed above may be extended from one-dimension (1D) to two-dimensions (2D) for image processing. The extension to 3D or even higher dimensions is similar. The wavelet analysis is mathematically extended from $L_2(R)$ to $L_2(R^2)$. At each stage of decomposition, a 2D function $f(x,y)$ can be decomposed into four components using three 2D B-wavelets and a 2D tensor product of B-splines. Each of these 2D B-wavelets serves as the impulse response to a 2D bandpass filter and the tensor product of a B-spline behaves as a 2D lowpass filter. These wavelets are constructed from the tensor product of the B-spline and the B-wavelet as follows:

$$\phi(2^k x - i)\psi(2^k y - j) = \Psi^{[1]}_{k,i,j}$$
$$\psi(2^k x - i)\phi(2^k y - j) = \Psi^{[2]}_{k,i,j} \quad \forall k,i,j \in ZZ \quad (50)$$

$$\psi(2^k x - i)\bar{\psi}(2^k y - j) = \Psi^{[3]}_{k,i,j}$$

where $\phi(x)$ is the $m^{th}$ order B-spline and $\psi(x)$ is the corresponding B-wavelet defined in Eq. (8). These wavelets are graphically shown in FIGS. 7a-7d. These 2D B-wavelets are not orthogonal to each other in the same scaled levels and there exist three dual wavelets at each resolution, so that $$<\Psi^{[m]}_{k,i,p} \bar{\Psi}^{[n]}_{l,j,p}> = \delta_{m,n} \delta_{k,l} \delta_{i,j} \delta_{p,q} \tag{51}$$

Any bivariate function $f_k(x,y)$ at the $k^{th}$ resolution level is decomposed into four components at a $(k-1)^{th}$ resolution level as:

$$f_k(x,y) = \sum_i \sum_j \left( c_{k-1,i,j} \Phi_{k-1,i,j} + \sum_{p=1}^{3} d_{k-1,i,j}[p] \Psi_{k-1,i,j} \right) \tag{52}$$

where $F_k$ is represented by a B-wavelet series $$f_k(x,y) = \sum_{i,j} c_{k,i,j} \Phi_{k,i,j} \tag{53}$$

with $\Phi(x,y)$ being the tensor product of two mth order B-splines $$\Phi(x,y) = \phi(x)\phi(y) \tag{54}$$

The coefficients in Eq. (52) are computed via the formulas $$c_{k-1,i,j} = \sum_m \sum_n a_{m-2i} a_{n-2j} c_{k,m,n} \tag{55}$$

$$d^{[1]}_{k-1,i,j} = \sum_m \sum_n a_{m-2i} b_{n-2j} c_{k,m,n} \tag{56}$$

$$d^{[2]}_{k-1,i,j} = \sum_m \sum_n b_{m-2i} a_{n-2j} c_{k,m,n} \tag{57}$$

$$d^{[3]}_{k-1,i,j} = \sum_m \sum_n b_{m-2i} b_{n-2j} c_{k,m,n} \tag{58}$$

where the $\{a_n\}$ and the $\{b_n\}$ are the decomposition sequences in Eqs. (35) and (36). Formulation of the reconstruction algorithm is similar.

Figure 8:
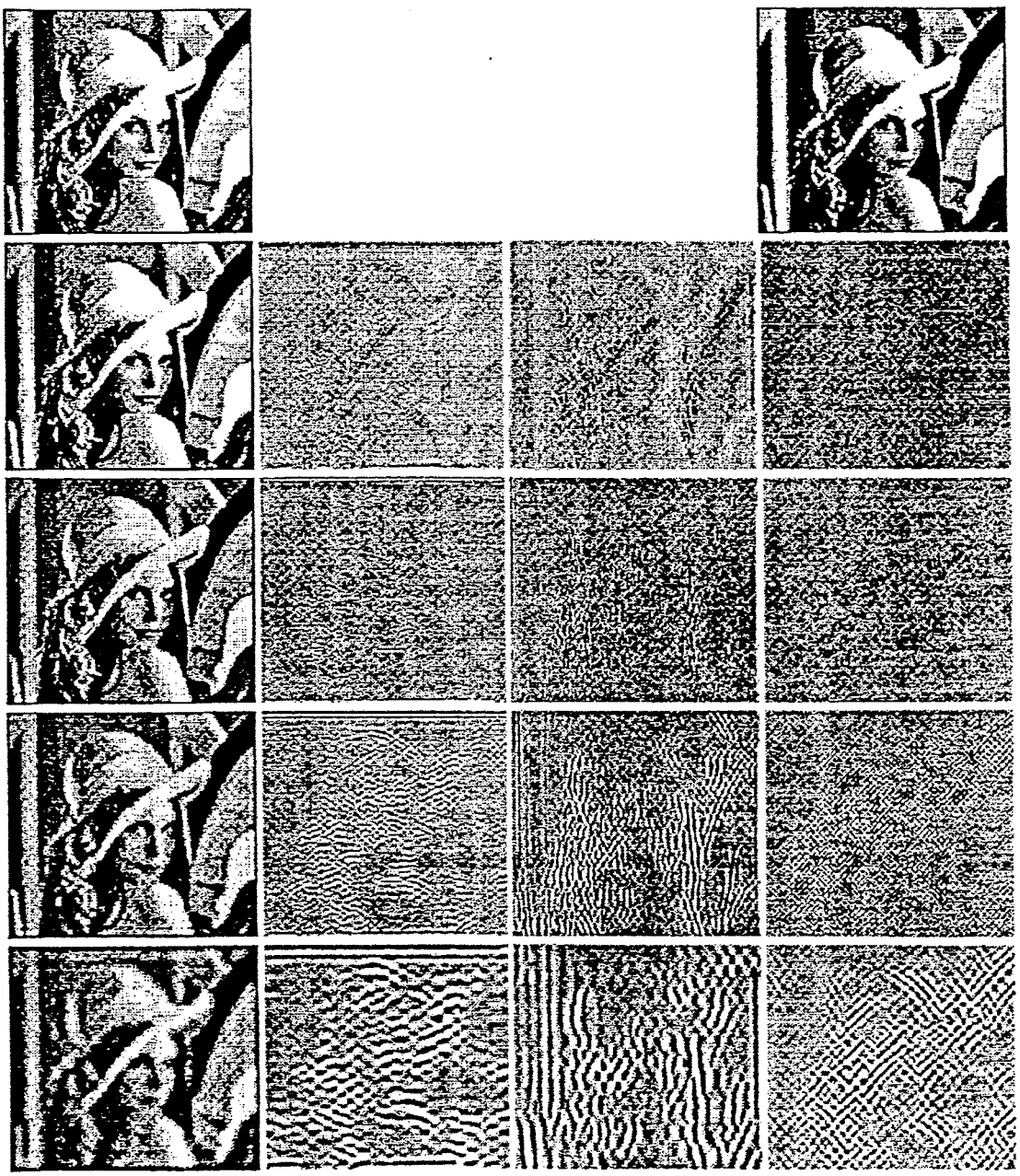
FIG. 8 is a gray-tone reproduction of an image and its corresponding splines and wavelets for k=−1, −2, −3 and −4, illustrating the decomposition and reconstruction process.
Figure 10:
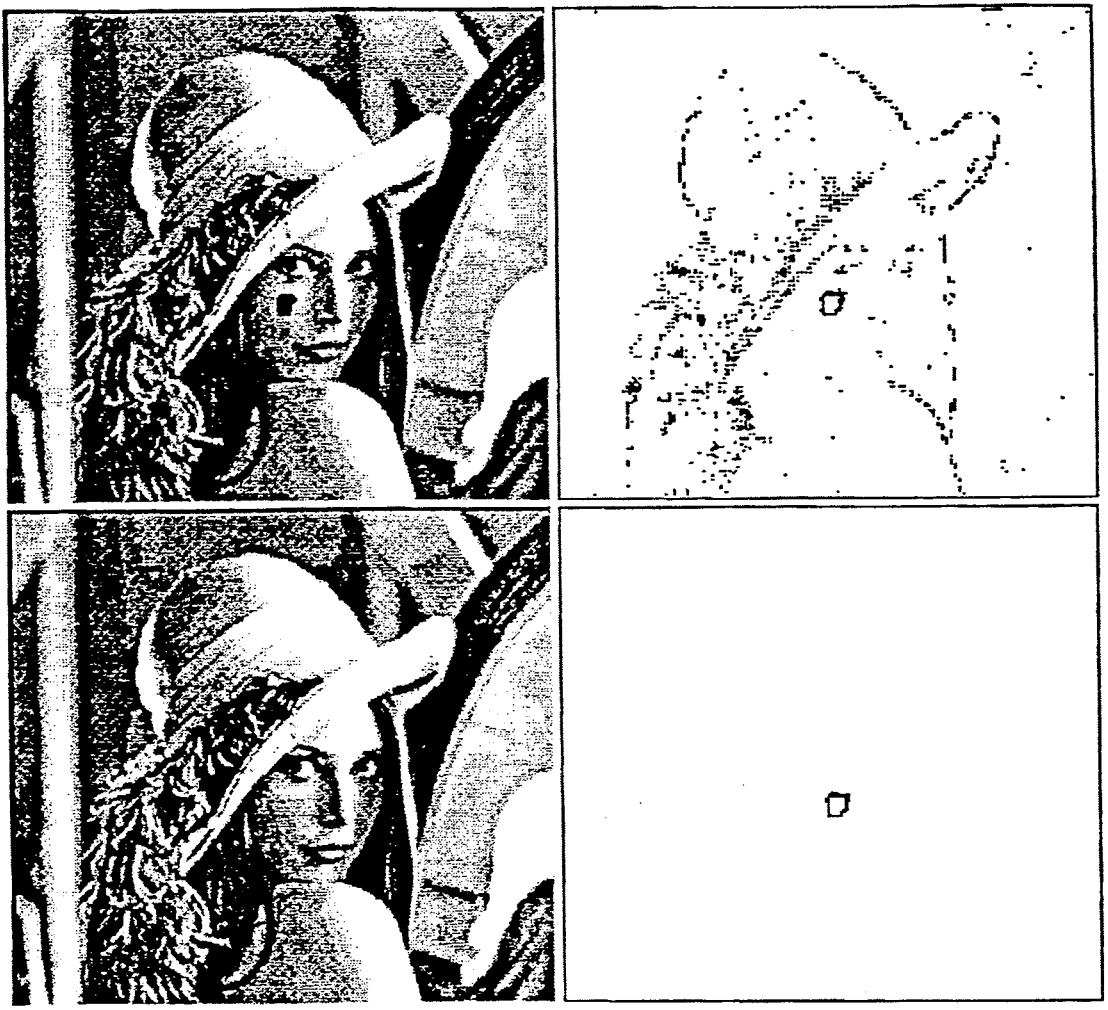
FIG. 10 is a gray-tone reproduction of an image similar to that shown in FIG. 7, shown spline-wavelet decomposition and reconstruction to remove an image defect.
Figure 11A:
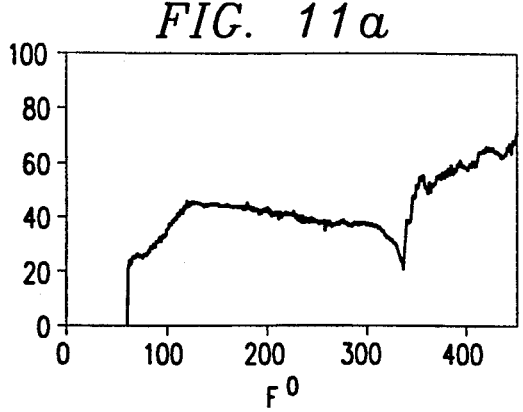
FIGS. 11a–11g are graphs of a force v. time drilling signal and its splines and wavelets for k=−1, −2 and −3, illustrating localization of a material separation event.
Figure 11B:
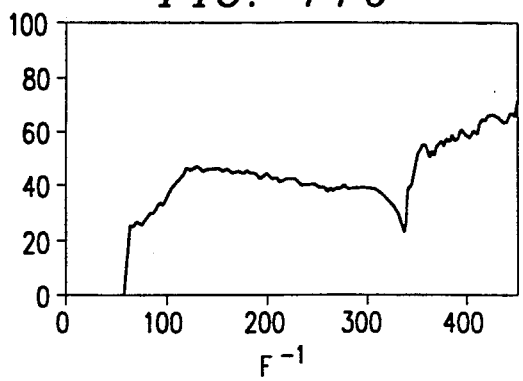
Figure 11C:
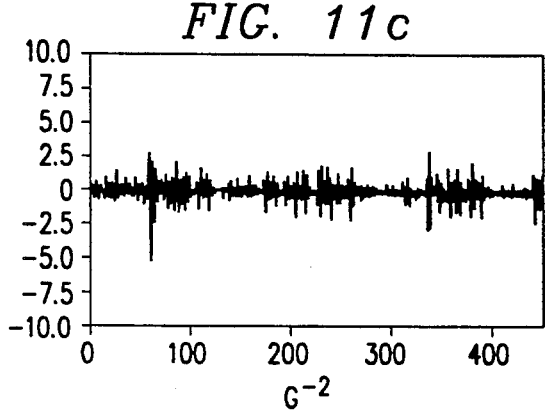
Figure 11D:
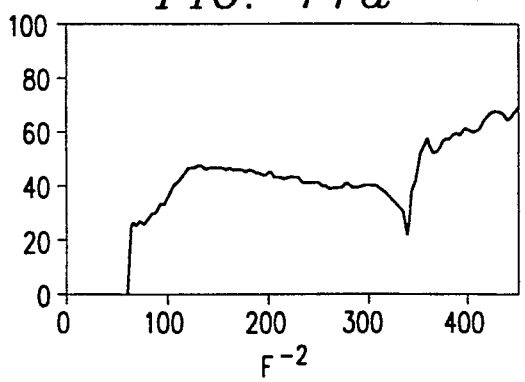
Figure 11E:
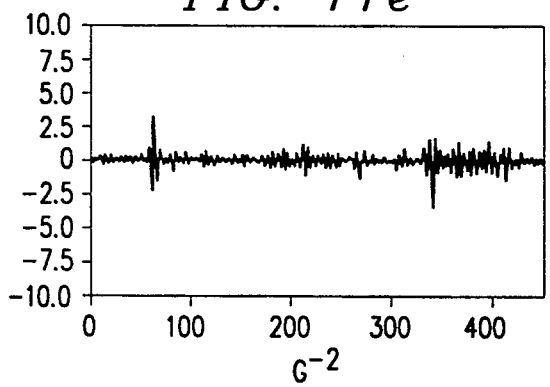
Figure 11F:
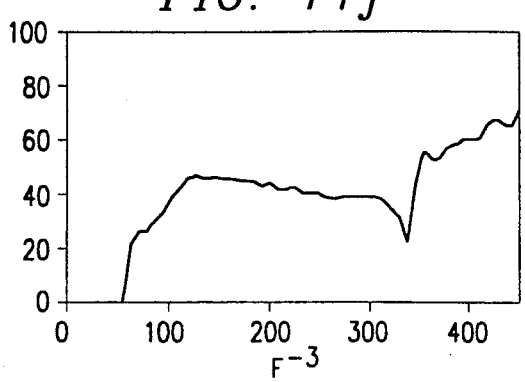
Figure 11G:
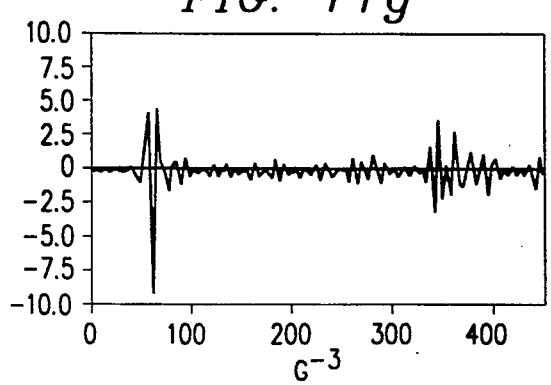
Figure 12A:
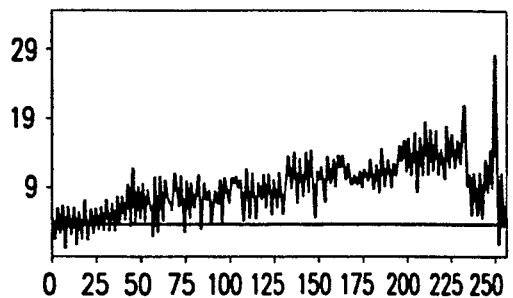
FIGS. 12a–12g are graphs of an amplitude v. time audio signal and its splines and wavelets for k=−1, −2 and −3, showing decomposition of the signal into octaves.
Figure 12B:
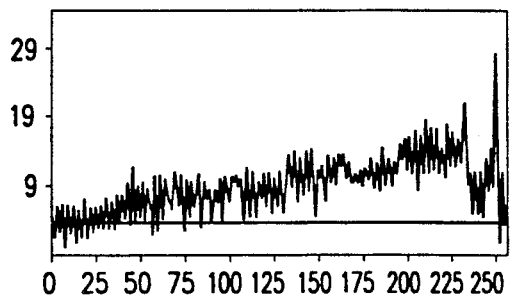
Figure 12C:
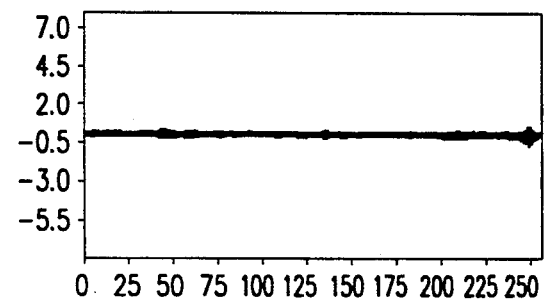
Figure 12D:
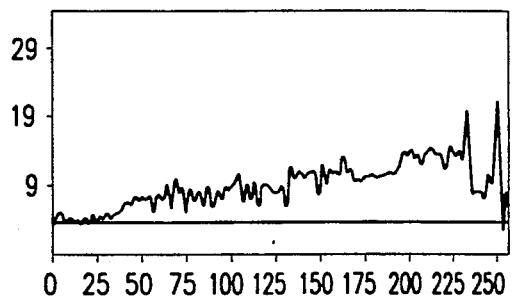
Figure 12E:
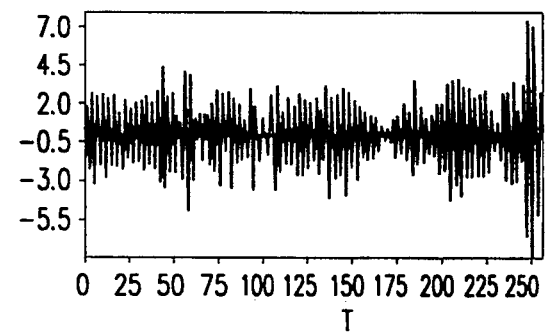
Figure 12F:
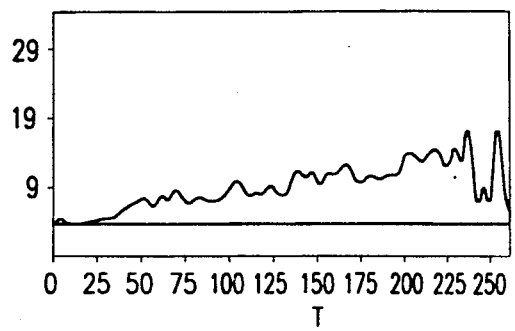
Figure 12G:
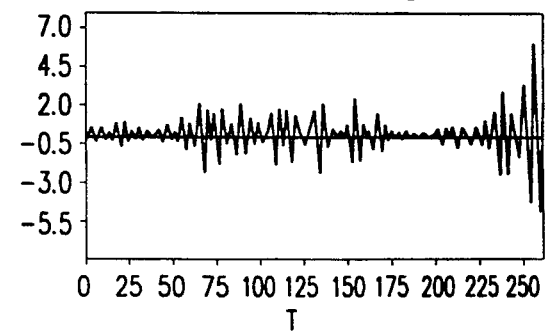

FIG. 8 demonstrates the decomposition and reconstruction of an image using the cubic B-wavelet (m=4). The upper left image is the original image while the upper right image is the reconstructed image. The four components of a decomposition stage are shown below the left image of each row. All the images are displayed by resampling of the spline and wavelet series at an array of 256×256 data points.

In FIGS. 9a-9d corners of a Texas Lone Star are detected by a corner detection algorithm using the information from $d^{[p]}$ computed in Eqs. (56)-(58). The star pattern is recovered from the corners by joining them together with straight lines. The corners are shown in FIG. 9c and the recovered pattern in FIG. 9d.

Numerical algorithms for processing images and corner detection are very efficient and require very little memory. The wavelet series representation of an image is useful for image coding and computer vision.

Apparatus

Figure 14:
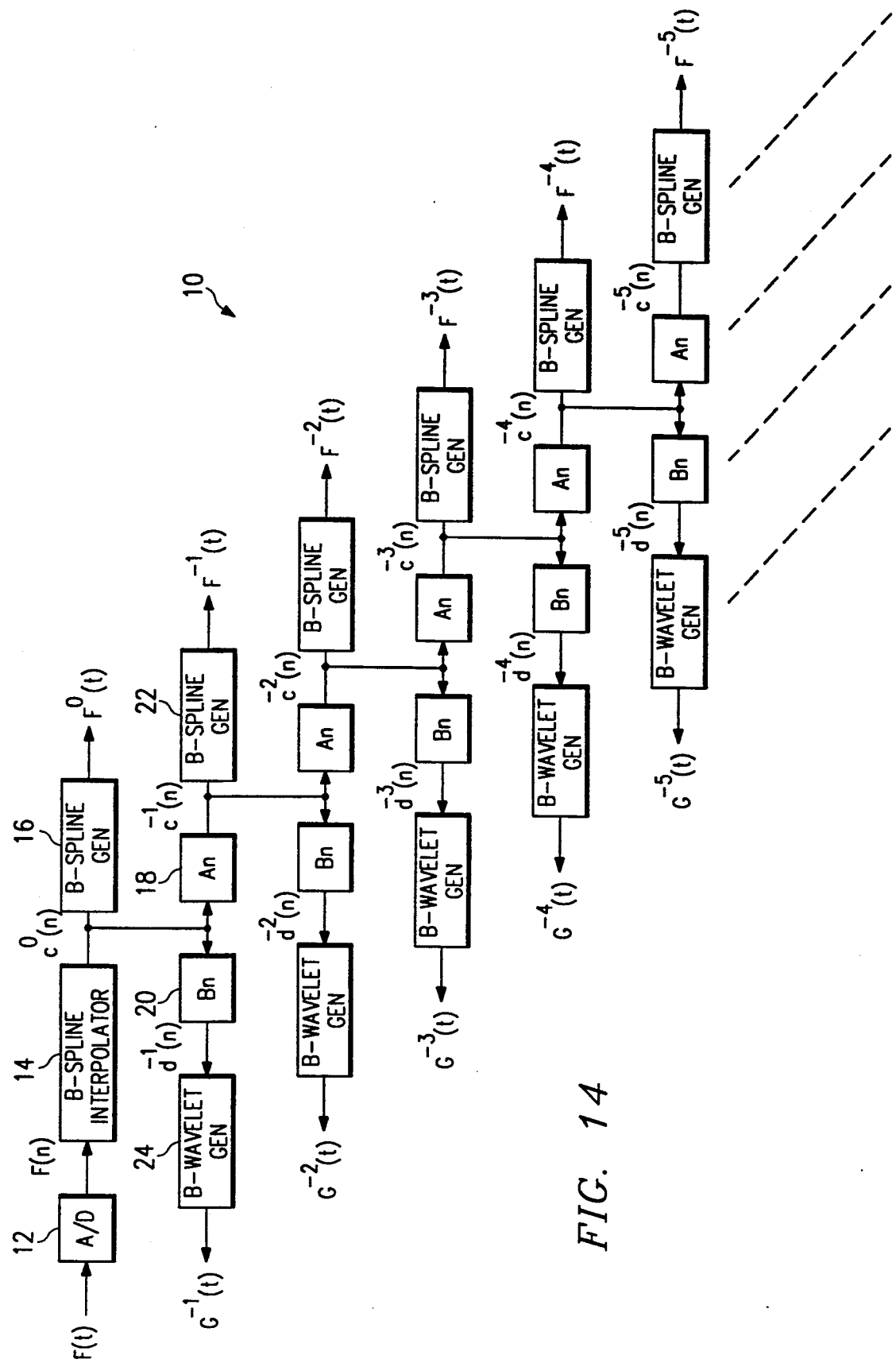
FIG. 14 is a high-level schematic diagram of a signal processor according to the invention.

The above discussion has concentrated on the theory by which splines and wavelets can be used to decompose and reconstitute signals with opportunities to process various components thereof. In this section, the inventors will describe a signal processor or analyzer that incorporates the algorithm of the invention. FIG. 14 is a high-level schematic block diagram of a signal processor according to the invention. The signal processor, indicated generally at 10, is capable of decomposing a signal F(t) into its spline components $F^{-1}(t)$, $F^{-2}(t)$, $F^{-3}(t)$ ... and wavelet components $G^{-1}(t)$, $G^{-2}(t)$, $G^{-3}(t)$ ... The apparatus and algorithms for recomposing the signal will be described later.

An analog signal F(t), which can for example be an electrical signal, is shown at the extreme upper left hand corner of FIG. 14. The analog signal F(t) is received by an analog/digital converter block 12. The signal F(t) is sampled at a specified sampling period h. For example, the sampling rate can be 20 kilohertz and the corresponding sampling period would then be 50 microseconds. These samples are then digitized. The output of the analog/digital converter 12 is F(nh), where h is the sampling period and n is the index of the sample being considered.

The digitized signal is fed to a B-spline interpolator 14, which will be described in more detail in conjunction with FIG. 15. The B-spline interpolator takes the samples of the signals F(0), F(2h), F(4h), F(6h) ... and multiplies them by a series of weights $w_{-4}$, $w_{-3}$, $w_{-2}$ ... $w_0$, $w_1$, $w_2$, $w_3$, $w_4$, in a moving average operation to derive a plurality of zero-level spline coefficients $c^0(n)$. The spline coefficients $c^0(n)$ may be used as an input to a spline generator 16 to reconstruct the analog signal as $F^0(t)$, where $F^0(t)$ represents that the signal so derived is a spline approximation to the original signal F(t).

The set of spline coefficients $c^0(n)$ is used as an input to an $A_n$ memory 18 and a $B_n$ memory 20. Block 18 contains a memory for the constants $a_n$ which are used to derive the $c^{-1}(n)$ spline coefficients according to Eq. (35). The block 20 contains a memory for the constants $b_n$ which are used to derive the wavelet coefficients $d^{-1}(n)$ by Eq. (36). The coefficients $c^{-1}(n)$ can be submitted to a B-spline generator 22, which may be identical to the B-spline generator 16, to derive the first-level spline $F^{-1}(t)$ of the signal. Similarly, the $d^{-1}(n)$ set of coefficients may be submitted to a B-wavelet generator 24 to derive the first-level wavelet $G^{-1}(t)$ of the signal F(t).

In a similar manner, the second level wavelet coefficients $d^{-2}(n)$ are derived from the first-level spline coefficients $c^{-1}(n)$, and the second-level spline coefficients $c^{-2}(n)$ are also derived from the first-level spline coefficients $c^{-1}(n)$. The derivation can be repeated for as many levels of resolution as is deemed necessary, as represented in FIG. 14 by the set of slanting lines to the lower right hand side.

Many of the functions of the components described may be performed by a signal processor, such as a TI signal processor, as programmed with a computer program containing the simple multiplication and summation algorithms described herein. For example, the B-spline interpolator 14 and memory $A_n$ 18 and $B_n$ 20 as well as the precursor-storing portions of the spline generators 16 and 22 and wavelet generators 24 may have their functions encoded into software. Alternatively, in view of the simplicity of the arithmetic operations involved, these functions may be incorporated into dedicated integrated circuits.

In FIG. 14, a global selection of the value of m is made to determine which apparatus will comprise the B-spline interpolator 14, the B-spline generator 16 and 22, and the B-wavelet generator 24. With m=2, linear versions of these components are selected. With m=4, cubic versions of these components are selected.

FIG. 15 is a schematic diagram of the B-spline interpolator 14. The interpolator 14 includes a register of nine weights (in the case of m=4, the preferred cubic spline and wavelet). The signal F(nh), as previously sampled and digitized, is multiplied by selected ones of the weights $w_{-4}^{(4)} \ldots W_4^{(4)}$ and then summed to obtain the zero-order spline coefficients $c^0(n)$. This multiplication and summing process is done according to a moving average. For example, at a first time $t_1$, the sampled and digitized signal, indicated at this point in time by a line of short dashes, has components F(0), F(2h), F(4h) and F(6h). Later sampled and digitized components of the signal F(t) have yet to be received at this point by the interpolator 14. Component F(0) is multiplied by $w_3^{(4)}$. Component F(2h) is multiplied by the weight $w_1^{(4)}$. The component F(4h) is multiplied by $w_{-1}^{(4)}$, while component F(6h) is multiplied by the weight $w_{-3}^{(4)}$. The weighted components $f \times w$ are then summed to yield the spline coefficient $c^0(1)$.

At $t_2$, the signal shifts over to the right by one weight, with F(0) being multiplied by $w_4^{(4)}$, F(2h) being multiplied by $w_2^{(4)}$, etc. This second multiplication and summing operation is represented by long dashed lines. As can be seen, the signal is being operated on by a set of weights one step to the right of the weights used for the first moving average summation. Component F(8h) is used for the first time. These weighted digitized samples are then summed to produce $c^0(2)$. At a third time $t_3$, F(0) is no longer used, but F(2h)–F(8h) are submitted to a set of weights one step to the right of the prior time and summed to produce $c^0(3)$. This is represented by the solid lines. In this way, all digitized samples of F(nh) are processed to yield a set or string of zero level spline coefficients $c^0(n)$.

Figure 16A:
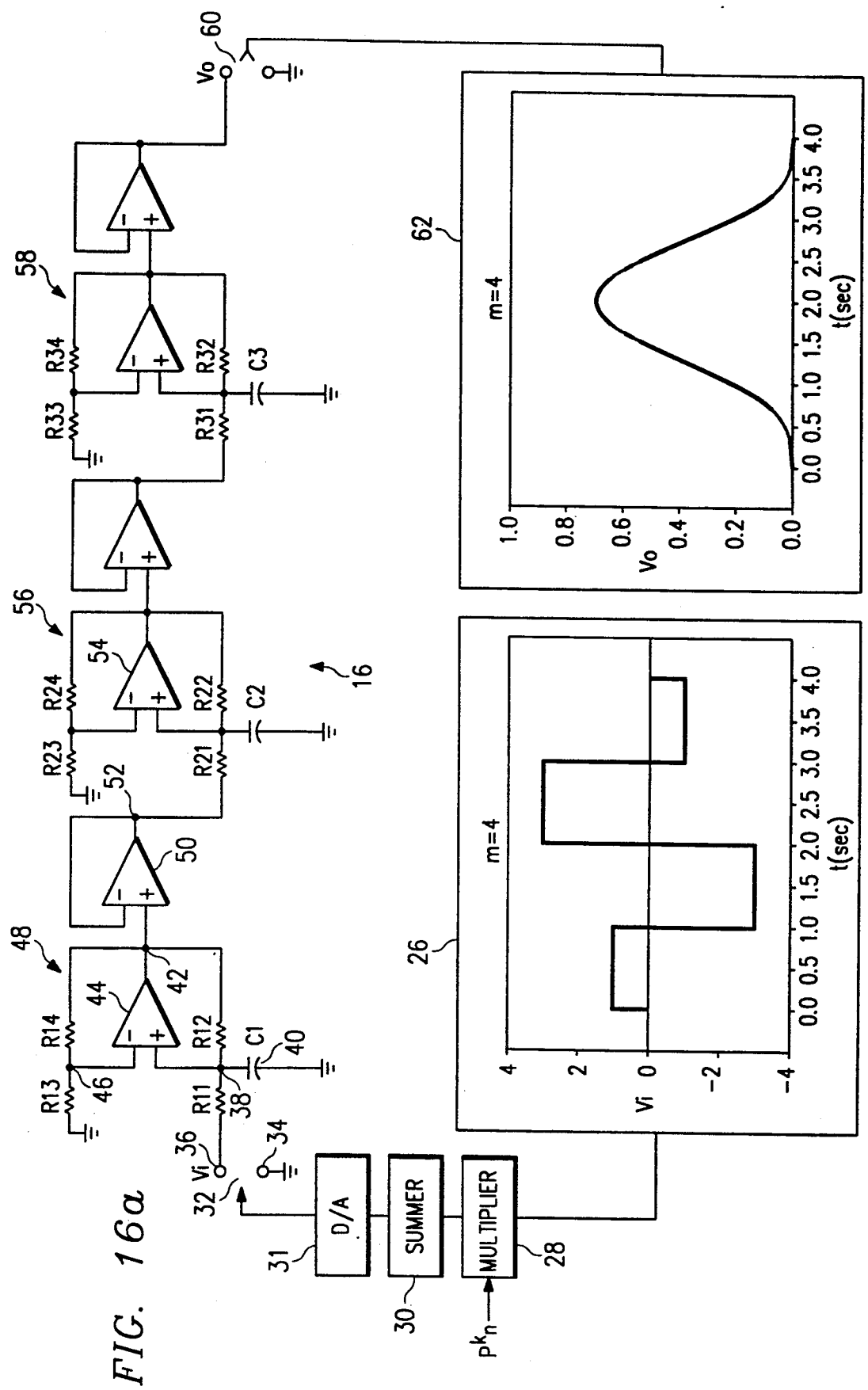
FIG. 16a is an electrical schematic diagram of a cubic spline generator according to the invention.

FIG. 16a is a schematic electrical circuit diagram of a cubic B-spline generator, which is indicated generally at 16. The cubic B-spline generator 16 may be used for either of the B-spline generators 16 or 22 or the other B-spline generators illustrated in FIG. 14. The cubic B-spline and cubic B-wavelet are particularly preferred for this invention, although the linear B-spline and the linear B-wavelet can also be used.

A memory (not shown) is used to store the parameters of a basic B-spline precursor waveform represented by its graph at 26, where the parameters represent the pulse amplitude at each interval shown in the figure. The cubic B-spline precursor 26 is a function having four steps.

Figure 19:
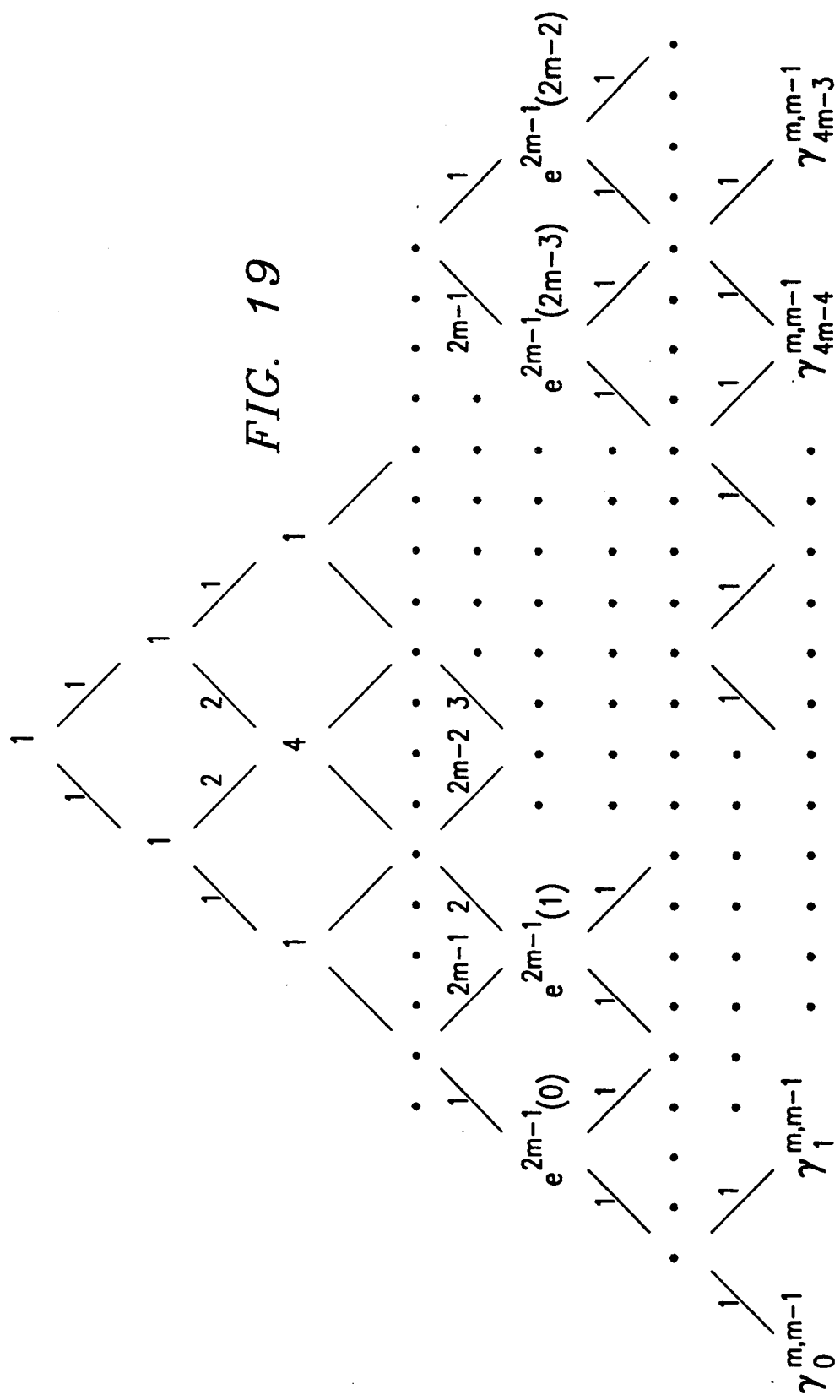
FIG. 19 shows an algorithm for finding the wave form of step functions for generative B-wavelets of any order.

The inventors have devised an algorithm, in terms of a Pascal triangle, to find the step functions for generating any B-spline. They have also devised an algorithm, in terms of a modified Pascal triangle, to find the waveform of step functions for generative B-wavelets of any order. An example is shown in FIG. 19 for the step function given below:

$$(-1)^n \gamma_n^{m,m-1} \chi_{[0,\frac{1}{2}]}(x - n/2). \tag{59}$$

The parameters of the cubic B-spline precursor waveform 26 are submitted to a multiplier 28. These parameters are multiplied by a string of the coefficient $c^k(n)$, where k is the level of resolution, in order to obtain a waveform having the shape of the spline precursor waveform 26 and having an amplitude that is dependent on the magnitude of the utilized ones of the coefficients $c^k(n)$.

Let the parameter of waveform 26 be represented by a set of components $\rho_q$, where q is equal to 1, 2, 3 or 4. The multiplied parameters will then be $\rho_q c^k(n)$ for each n. The multiplied components $\rho_q c^k(n)$ are then summed by a summer 30 which produces a sequence $\rho^k(n)$, as equal to the following $$\rho^k(n) = \rho_1 c^k(n-1) + \rho_2 c^k(n-2) + \rho_3 c^k(n-3) + \rho_4 c^k(n-4), \tag{60}$$

where $\rho^k(n)$ is the nth value of the sequence.

The sequence $\rho^k(n)$ is fed to the input port of a digital to analog converter 31. The output of the converter 31 is an intermediate analog step function signal.

The intermediate step function signal is fed to an input 32 that includes a ground terminal 34 and a voltage terminal 36. A resistor R11 connects the positive voltage terminal 36 to a node 38. A capacitor 40, which may for example be chosen as 100 microfarads, connects the node 38 to ground. A resistor R12 connects the node 38 to a node 42. The node 38 is also connected to the positive terminal of an operational amplifier 44. A resistor R13 connects a node 46 to ground. Node 46 is connected to the negative terminal of the operational amplifier 44, and is connected through resistance R14 to the node 42. R11, R12, R13 and R14 may be chosen as 20KΩ. The output of the op amp 44 is also connected to node 42. The op amp 44 and its associated resistors R11–R14 act as an integrator indicated generally at 48.

The output node 42 of the integrator 48 is connected to the positive terminal of a second op amp 50. An output node 52 of the op amp 50 is connected back to a negative terminal of the op amp 50, configuring the op amp 50 as a buffer. This is the first stage of a three-stage integrator which is used to obtain the spline function derived from the coefficient string $c^k(n)$. The output node 52 is connected through resistance R21 to the positive input of an op amp 54 to perform a second integration on the now once-integrated intermediate step function signal. The second stage of the spline generator is indicated generally at 56. The process is repeated with a third stage 58 of the spline generator to yield a spline at its output 60. A representative cubic B-spline is shown in the graph 62. The illustrated B-spline takes the shape shown only for a first coefficient $c^k(0)$. As further spline coefficients $c^k(n)$ are submitted to the spline generator, the resultant spline function $F^k(t)$ will be the sum of several such splines weighted by the spline coefficients $c^k(n)$ and appropriately shifted. Note that the spline precursor waveform 26 is selected such that the resultant cubic B-spline 62 has four spline segments which are joined continuously and smoothly. The generated cubic spline is said to be continuous through the second derivative.

Figure 16B:
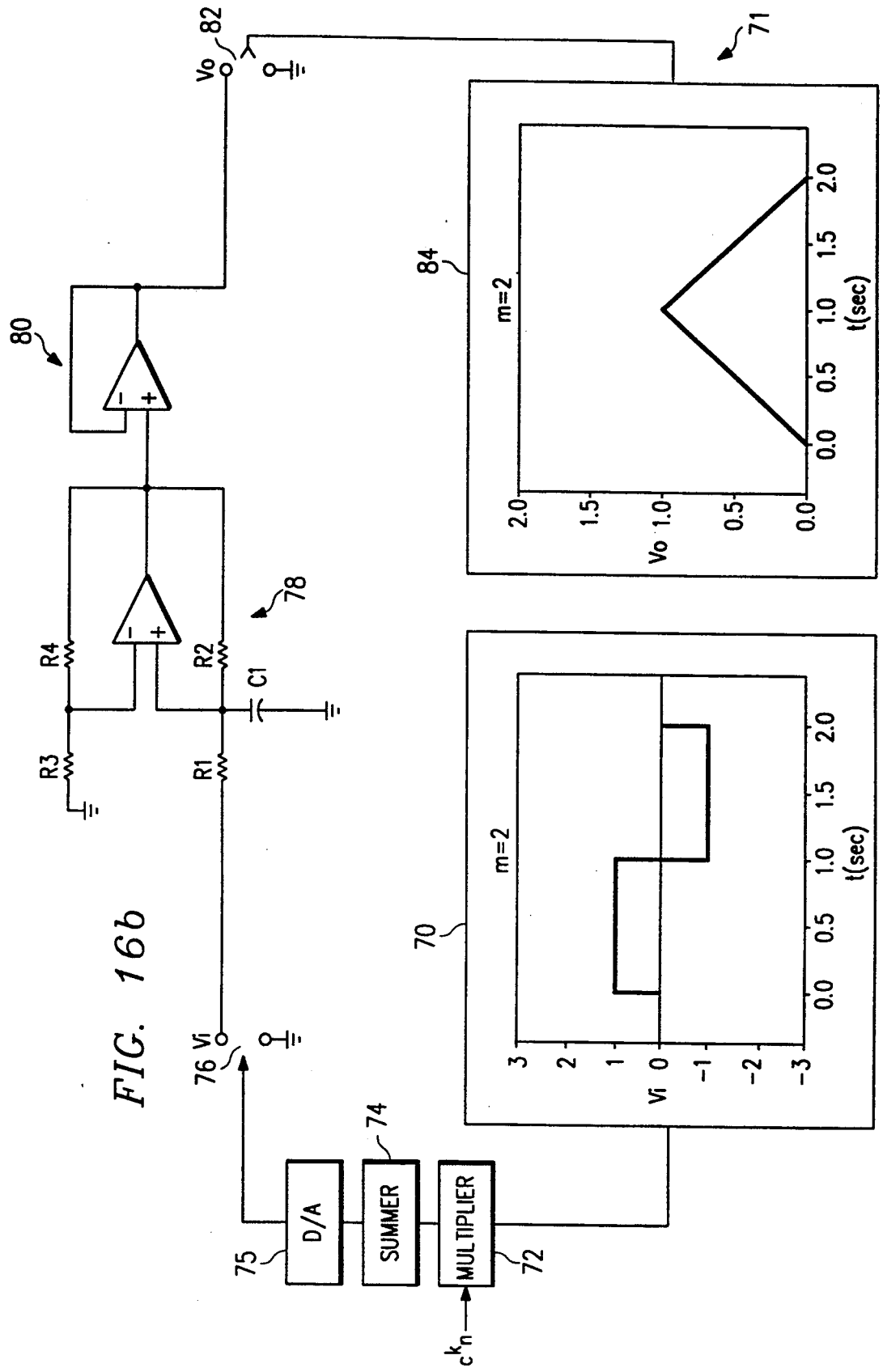
FIG. 16b is an electrical schematic diagram of a linear spline generator according to the invention.

FIG. 16b is a schematic electrical circuit diagram of a linear spline generator which can be incorporated into the signal processor 10 (FIG. 14) by being the spline generator 16 or 22 or any of the other illustrated spline generators in that figure. Except for the number of stages and the linear spline precursor step function waveform indicated at 70, the linear B-wavelet generator indicated generally at 71 is similar in its construction to the cubic spline generator shown in FIG. 16a. A memory 70, which can be a dedicated EPROM or alternatively a portion of a program run on a signal processor, contains the parameters of linear spline precursor waveform. This memory is connected to a multiplier 72. The parameters of the waveform is are multiplied in the multiplier 72 by a string of linear spline coefficients $c^k(n)$ derived from the signal or from prior strings of spline coefficients. The multiplied precursor waveform parameters are then summed in a summer 74 in a manner described previously for the cubic B-spline generator 16 (FIG. 16a), except that only one shift of prior multiplied waveform components is made instead of using up to four prior strings of waveform components.

The waveform 70 is a step function having two steps and spread out between 0 and 2 seconds. Although the time scale given is in whole seconds, the actual time scale of the graph will depend directly on the sampling period h; if the sampling frequency is in nanoseconds, the x axis of the waveform will also be measured in nanoseconds.

The multiplied and summed components are submitted to a digital to analog converter 75, and the signal output from converter 75 appears at voltage input 76. This signal is integrated by a single integration stage as indicated generally at 78 and passes through the buffer as indicated generally at 80 to produce a spline at its output 82. The spline output waveform is indicated at 84, and is representative of the spline that would be produced if a single spline coefficient $d_0^k$ were submitted. The actual spline that is generated will be a summation of splines 84 appropriately shifted along the time axis.

Figure 17A:
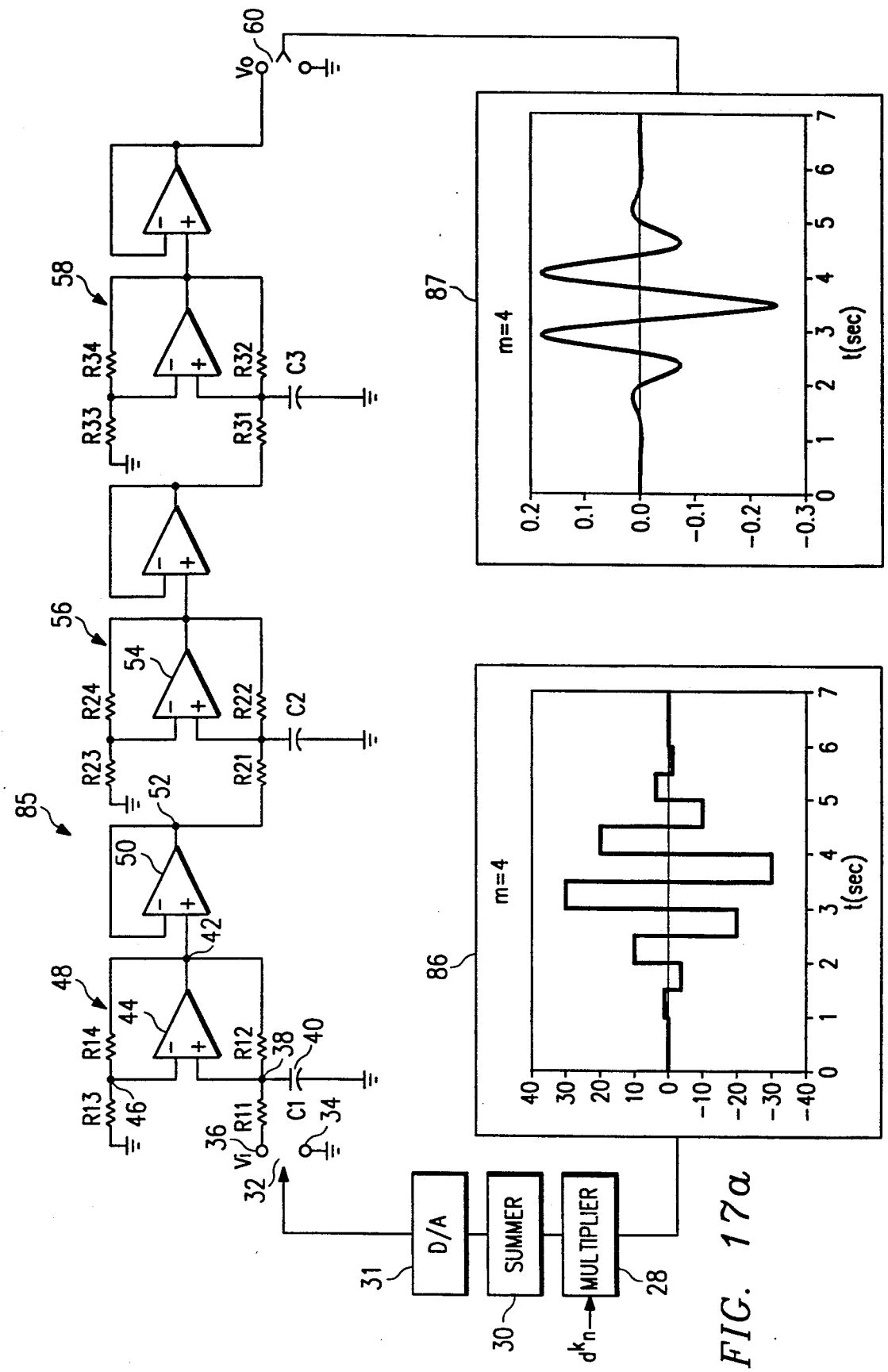
FIG. 17a is an electrical schematic diagram of a cubic wavelet generator according to the invention.

FIG. 17a is a partly logical, partly schematic diagram of a cubic spline wavelet generator according to the invention and indicated generally at 85. Cubic wavelet generator 85 can be used advantageously in performing the functions of wavelet generator 24 or the other wavelet generators illustrated in FIG. 14. Except for the wavelet precursor step function waveform 86 and the associated memory (not shown), the spline wavelet generator 85 is identical in construction to the spline generator 16 illustrated in FIG. 16a. Like numbers therefore identify like parts between these two drawings. Like the cubic spline generator illustrated in FIG. 16a, the wavelet generator 85 comprises three integrator/buffer sections 48, 56 and 58 which operate on the intermediate step function signal input at port 32 to produce a wavelet function 87 at its output 60. The input wavelet precursor waveform 86 is a function including fourteen steps, and is chosen to give an output wavelet function 87 that is continuous through the second derivative.

Figure 17B:
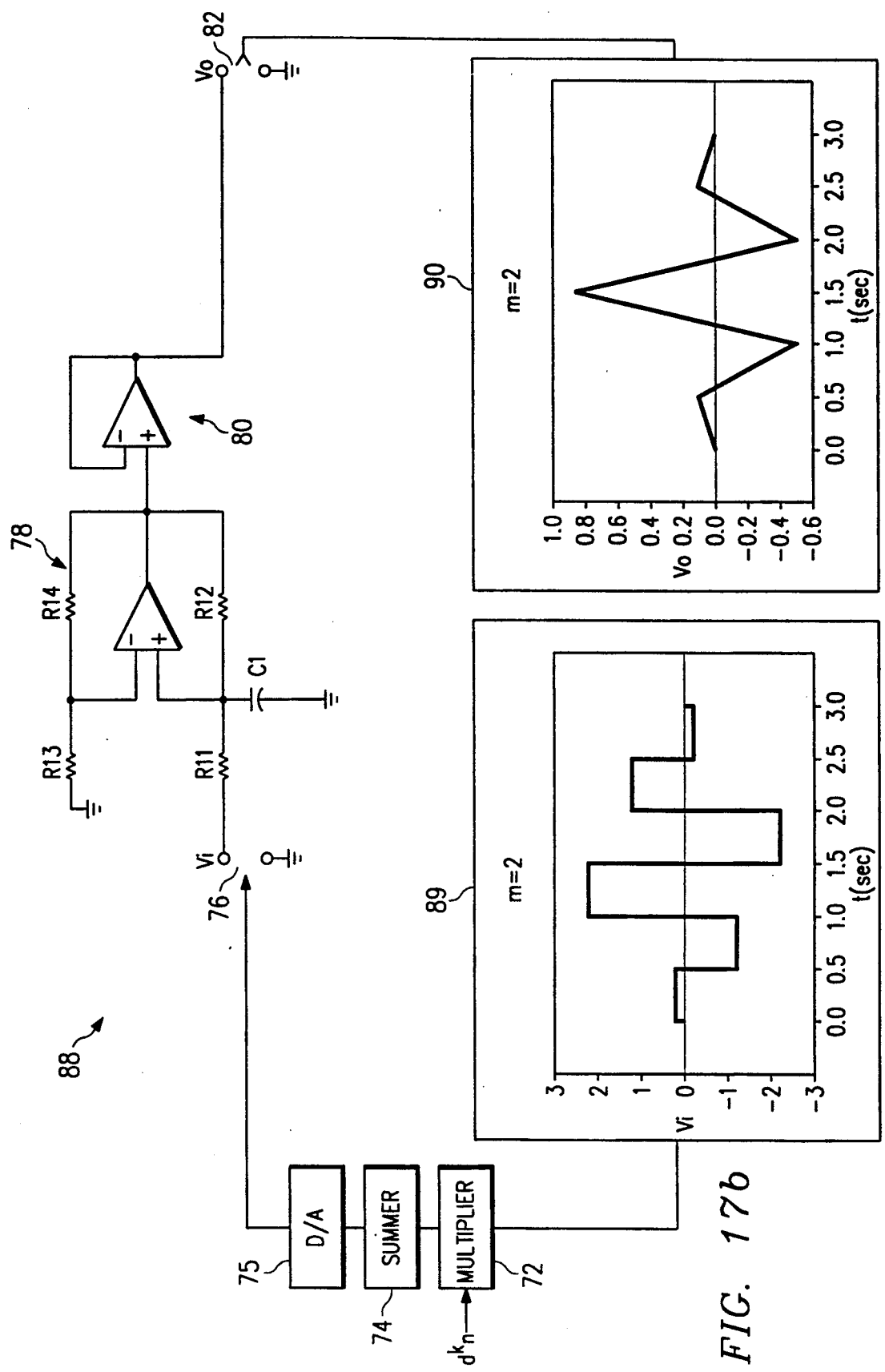
FIG. 17b is an electrical schematic diagram of a linear wavelet generator according to the invention.

FIG. 17b illustrates a linear spline wavelet generator indicated generally at 88 which, except for its precursor waveform 89, is in its construction identical to the linear spline generator illustrated in FIG. 16b. Like numbers therefore identify like parts between these two figures. The linear wavelet precursor waveform 89 is a step function including six steps which is input to the multiplier 72. There, the currently taken six members of the wavelet coefficients $d^k(n)$ are multiplied by the parameter of the wavelet precursor waveform and then sent to the summer 74. The summer 74 is used to combine the multiplied precursor waveform parameters with ones from earlier strings of multiplied coefficients in a manner previously described, and is then submitted to a digital/analog converter 75. An intermediate analog waveform signal is sent to an input 76 of the integrator 78. After the output signal is buffered at 80, a linear wavelet is produced at the output 82, and this is illustrated by the graph at 90. The waveform shown at 90 would result from a single input coefficient; subsequent input coefficients will cause further wavelets 90 to be generated having different displacements from zero in different magnitudes, which are summed to produce a time function $G^{-1}(t)$ of the input signal $F^0(t)$.

Figure 18:
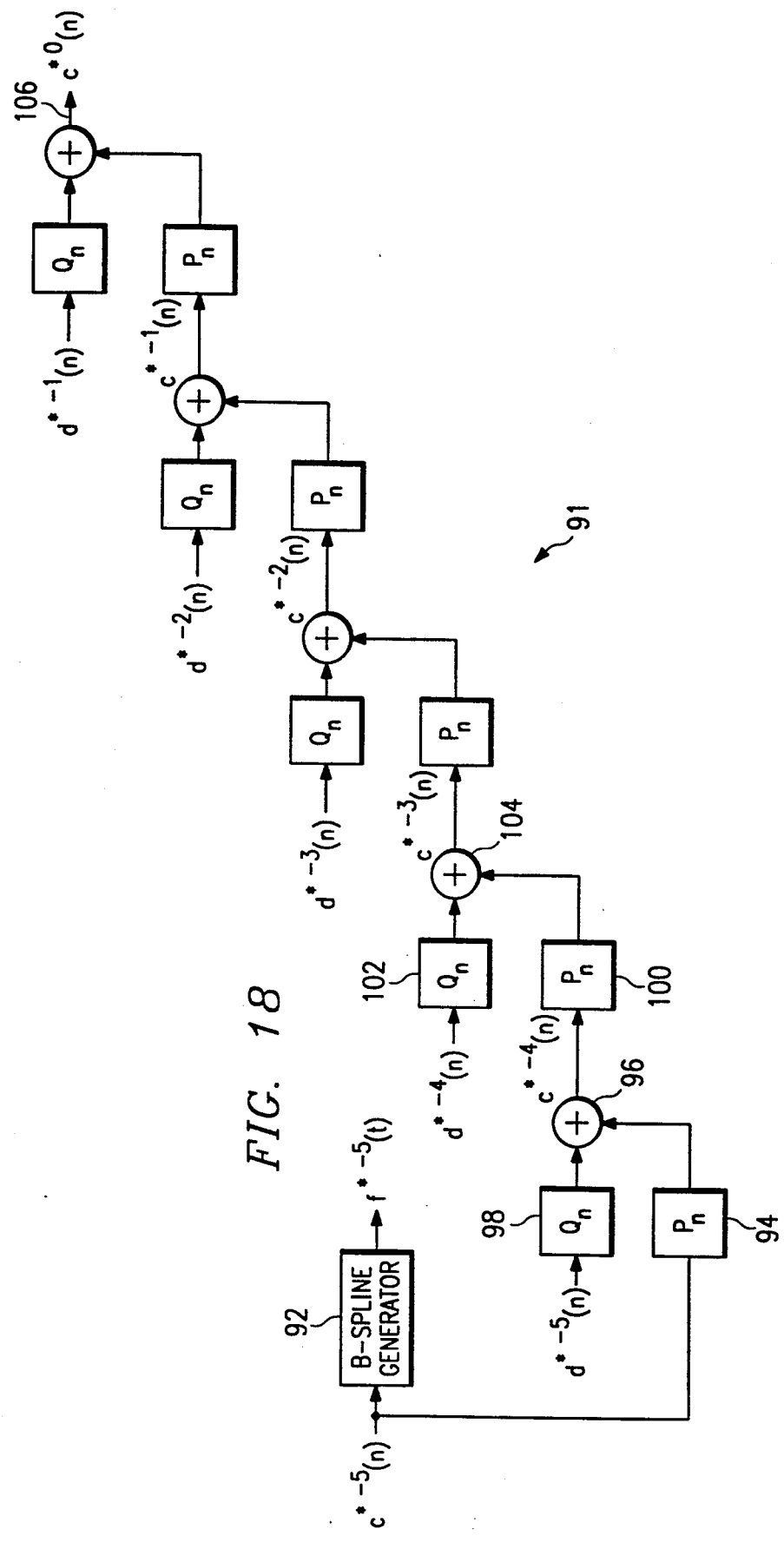
FIG. 18 is a high-level schematic diagram of spline-/wavelet signal reconstruction apparatus according to the invention.

FIG. 18 is a high-level schematic block diagram of a reconstruction signal processor indicated generally at 91. The signal processor 91 may be instantiated entirely into a software program as run by a signal processor, or may alternatively take physical form in one or more dedicated semi conductor chips. The later alternative is possible because of the extremely simple operations required by the reconstruction algorithm.

As described in the theory above, a processed signal can be reconstructed from the last-level spline $c^k(n)$ and the generated wavelets $d^{-*k}(n)$, $d^{*-(k-1)}(n)$, $d^{*-(k-2)}(n) \ldots d^{*-1}(n)$. In FIG. 18, the fifth-level spline coefficient string $c^{-5}(n)$, derived from signal processor 10 (see FIG. 14) is used as an example of reconstruction. This set of spline coefficients $c^{-5}(n)$ may be submitted to a spline generator 92, but also to a memory containing a set of constants $p_n$. The fifth-level spline coefficients $c^{-5}(n)$ (or coefficients $c^{*-5}(n)$, the asterisk indicating that the original coefficients have been improved, filtered or processed) are operated on by the set of coefficients $p_n$ and are output to a straight (non-moving average) summer 96.

The fifth-level wavelet of coefficients $d^{*-5}(n)$ processed by removing noise and the like, is input to a memory 98 storing the coefficients $q_n$. The fifth-level wavelet coefficients are operated on by the coefficients $q_n$ in a manner previously described and then output to the summer 96. The summer 96 takes these two multiplied sets of coefficients as in Eq. (37) and sums them to produce a set of spline coefficients $c^{*-4}(n)$, or a processed fourth-level set of spline coefficients.

The $c^{*-4}(n)$ coefficients are input to another $p_n$ block 100 and operated on again. The processed fourth-level wavelet coefficients $d^{*-4}(n)$ are input to a second $q_n$ block 102. These two data streams are summed by summer 104 to produce the third-level processed spline coefficients $c^{*-3}(n)$.

The multiplying by coefficients $p_n$, $q_n$ and subsequent summing proceeds upward in a similar manner until a final set of processed spline coefficients $c^{*0}(n)$ is produced at 106. These can be submitted to a spline generator (see FIG. 16a or 16b) to derive a complete processed signal $F^{*0}(t)$.

The signal processor as above described has several applications. One is as a radar analyzer as more particularly described in conjunction with FIGS. 3a-3c. A second application is that of a tool wear detector, illustrated in FIGS. 4a-4g.

A similar application to interpretation of drilling data is shown on FIGS. 11a-11g, which are the spline signals $F^0$-$F^3$ and wavelet signals $G^{-1}$-$G^{-3}$ of a graph of a force signal versus time. As the drill proceeds through the material, spikes are noted in the first, second and third-level wavelets $G^{-1}$, $G^{-2}$ and $G^{-3}$. These spikes can then be used as a means for signaling a material separation.

FIGS. 12a-12g are a similar set of spline and wavelet signals $F^0$-$F^{-3}$, $G^{-1}$-$G^{-3}$ for an audio signal containing components in first, second and third octaves. After the signal has been decomposed into its respective splines and wavelets, the signal may be processed by discarding the wavelet signals $G^{-1}$ and $G^{-2}$. The remaining spline signal $F^{-3}$ and the wavelet signal $G^{-3}$ may be reassembled to create a signal from which much noise has been reduced.

FIGS. 12a–12g illustrate another possible use of the signal processor of the invention. That is, the first, second and third octaves can be segregated. It is then possible to magnify selected ones of these octaves, such as for example the third octave represented by $G^{-3}$, and then reassemble the signal. This signal, as using an amplified third octave $G^{*-3}$, can be used, for example, in hearing aid applications and also may be useful for stereo equalizer systems.

FIGS. 13a–13g are a set of splines and wavelets illustrating the problem of finding an edge. Once the signal has been decomposed, an edge is clearly discernable in the first-level wavelet $G^{-1}(t)$. This wavelet transform of the signal can then be used to signal the occurrence of the edge.

Conclusions

The inventors have disclosed nth order B-wavelets and their dual wavelets and have explored their signal processing capabilities. In contrast with other wavelets, the inventors have demonstrated that by giving up the orthogonality on the same scale levels, these B-wavelets and their duals have linear phases, and their explicit formulas facilitate easy implementation using waveforms of step functions with finite lengths. In addition, nearly real-time processing is possible since all the algorithms involve only simple moving average operations.

In addition to the linear phase characteristics of the wavelets and the dual wavelets, the inventors have described the sequences for decomposition and reconstruction. If the order of B-spline is chosen to be even, all the algorithms and the wavelets have linear phase. In fact, the entire decomposition and reconstruction algorithm has zero phase which means that the original signal can be perfectly reconstructed from the signal components. The inventors also have disclosed the B-wavelet as a bandpass filter. The out-of-band rejection of the filter characteristic is better than $-100$ db for m=4. The Q of the bandpass filters at different resolutions is calculated to be a constant, showing that the decomposition algorithm acts on the signal as a constant Q multiband filter bank. The window properties of the B-wavelets have also been described. For time domain localization of sharp changes in the signal, the B-wavelet with m=2 has smaller support and works better than wavelets of higher order m.

Both the decomposition and reconstruction algorithms have been disclosed described in detail. They have also been extended to two dimensions for processing of images. The three 2D wavelets are constructed by simple tensor products of the B-spline and the B-wavelets. Examples with very good results have been disclosed herein.

There are many other engineering applications of the signal analyzer disclosed herein. In particular, areas such as EKG analysis, reprocessing of music, picture phones, and image coding can be benefitted by the use of explicitly formulated spline-wavelets.

The processor of the invention also has application to next-generation computers because it would permit efficient computer storage for computer graphics and still videopictures; better interpretation of seismic information, as it relates to oil and mineral deposits; safety warning devices, wherein the processor could sense an impending failure of airplane engines or nuclear plant reactors by detecting unusual sound patterns; the repair of diesel and gasoline engine valves; defense applications, such as the accurate distinction of sounds of super-silent enemy submarines; weather reports; radar; and sonar.

While several embodiments of the present invention and their advantages have been described in the above detailed description, the invention is not limited thereto but only by the scope and spirit of the appended claims.

What is claimed is:

1. A signal processor, comprising:
   means for receiving an analog signal;
   means for sampling the analog signal at a predetermined sampling period to produce a plurality of discrete signal samples;
   means for digitizing the discrete signal samples to produce a plurality of digital signal samples;
   means for generating a plurality of spline coefficients of the zero level in response to receiving the digital signal sample, said means for generating including means for multiplying a plurality of predetermined stored weights to respective selected ones of the digitized signal samples and means for summing the weighted digitized signal samples together in a moving average operation to derive zeroth-level B-spline coefficients;
   means for multiplying the zeroth-level B-spline coefficients in a moving average operation by a plurality of $a_n$-constants to derive a plurality of first-level B-spline coefficients for the signal;
   means for multiplying the zeroth-level B-spline coefficients in a moving average operation by a plurality of $b_n$-constants to derive a plurality of first-level wavelet coefficients;
   means for generating at least one spline function from at least one respective set of spline coefficients; and
   means for generating at least one wavelet function from at least one respective set of wavelet coefficients whereby the analog signal is processed for analyzing frequency information of the analog signal.

2. The signal processor of claim 1, and further comprising:
   S additional processor stages, where $S \geq 1$, each said stage comprising for the xth additional stage $(x \epsilon 1..S)$:
   means for multiplying the x-level spline coefficients in a moving average operation by said plurality of $a_n$-constants to derive a plurality of $(x+1)$-level spline coefficients;
   means for multiplying the x-level spline coefficients in a moving average operation by said plurality of $b_n$-constants to derive a plurality of $(x+1)$-level wavelet coefficients;
   means for generating the $(x+1)$-level spline function from the $(x+1)$-level spline coefficients; and
   means for generating the $(x+1)$-level wavelet function from the $(x+1)$-level wavelet coefficients.

3. The signal processor of claim 1, wherein said means for generating at least one spline function comprises:
   means for storing parameters of a spline precursor waveform;

means for multiplying a selected string of the spline coefficients by the parameters of spline precursor waveform;

means for summing the multiplied parameters of spline precursor waveform with portions of prior parameters of spline precursor waveforms derived from prior spline coefficient strings to produce an intermediate signal;

means for integrating the intermediate signal a number of times equal to the order of spline sought to be generated minus one; and means for outputting the integrated intermediate signal as the spline function.

4. The signal processor of claim 3, and further comprising, for each said means for integrating, a buffer coupled to an output of said means for integrating.

5. The signal processor of claim 3, wherein said spline precursor waveform comprises a step function of finite length.

6. The signal processor of claim 1, wherein said means for generating at least one wavelet function comprises:

means for storing parameters of a wavelet precursor waveform;

means for multiplying a selected string of the wavelet coefficients by the parameters of wavelet precursor waveform;

means for summing the multiplied parameters with portions of prior multiplied parameters derived from prior wavelet coefficient strings to produce an intermediate signal;

means for integrating the intermediate signal a number of times equal to the order of wavelet sought to be generated; and means for outputting the integrated intermediate signal as the wavelet function.

7. The signal processor of claim 6, wherein said means for integrating has an output, a buffer coupled to said output of said means for integrating.

8. The signal processor of claim 6, wherein said wavelet precursor waveform comprises a step function of finite length.

9. A linear spline function generator, comprising:

a memory for storing parameters of a spline precursor function, said parameters preselected such that an analog signal based thereon, when integrated, will yield a linear B-spline;

a multiplier, a first port of said multiplier receiving said parameters of said spline precursor function, a second port of said multiplier receiving a string of spline coefficients, an output of said multiplier outputting a plurality of current sets of multiplied parameters in response to receiving said parameters of said spline precursor function and said string of spline coefficients;

a summer for summing said current multiplied parameters with stored prior multiplied precursor parameters and generating an intermediate sequence in response thereto;

a digital to analog converter having an input port for receiving said intermediate sequence and an output port for outputting an intermediate signal;

an integrator having an input port for receiving said intermediate signal and an output port, an integrated intermediate signal appearing at said output port in response to the receipt of said intermediate signal at said input port of said integrator; and a buffer having an input port coupled to said output port of said integrator, said linear spline function appearing at said output port of said buffer in response to said integrated intermediate signal being received at said input port thereof.

10. The generator of claim 9, wherein said spline function is a step function of finite length.

11. A linear spline wavelet function generator, comprising:

a memory for storing parameters of a spline wavelet precursor function, said parameters preselected such that an analog signal based thereon, when integrated, will yield a linear B-wavelet;

a multiplier, a first port of said multiplier receiving said parameters, a second port of said multiplier receiving a string of wavelet coefficients, an output of said multiplier outputting a plurality of current sets of multiplied parameters in response to receiving said parameters and said string of wavelet coefficients;

a summer for summing said current multiplied parameters with stored prior multiplied precursor parameters and generating an intermediate sequence in response thereto;

a digital to analog converter having an input port for receiving said intermediate sequence and an output port for outputting an intermediate signal;

an integrator having an input port for receiving said intermediate signal and an output port, an integrated intermediate signal appearing at said output port in response to the receipt of said intermediate signal at said input port of said integrator; and a buffer having an input port coupled to said output port of said integrator and an output port, said linear wavelet function appearing at said output port of said buffer in response to said integrated intermediate signal being received at said input port thereof.

12. The generator of claim 11, wherein said spline wavelet precursor function is a step function of finite length.

13. A wavelet generator for generating an mth order wavelet function of a sequence, comprising:

a memory for storing parameters of a B-wavelet precursor function which, when passed-through a digital to analog converter and integrated (m−1) times and buffered (m−1) times, will yield a B-wavelet of the mth order;

a multiplier, a first port of said multiplier receiving said B-wavelet precursor parameters, a second port of said multiplier receiving a string of wavelet coefficients derived from said signal, an output of said multiplier outputting a plurality of current multiplied precursor parameters in response to receiving said B-wavelet precursor parameters and said string of wavelet coefficients;

a summer for summing said current multiplied precursor parameters with stored prior multiplied precursor function wavelet elements and generating an intermediate sequence in response thereto;

a digital to analog converter having an input port for receiving the said intermediate sequence and an output port for outputting an intermediate signal; and (m−1) integrating and buffering stages, each of said integrating and buffering stages comprising an integrator having an input port and an output and a buffer having an input coupled to said output of said integrator and an output port thereof, said input port of a first of said integrating and buffering stages operable to receive said intermediate signal, said mth order wavelet function of said signal appearing at said output port of a last of said integrating and buffering stages in response to said input port of said first stage receiving said intermediate signal.

14. The wavelet generator of claim 13, wherein each of said integrating and buffering stages comprises:
   an input port;
   a resistance for coupling said input port to a first node;
   a capacitor coupling said first node to ground, a positive input of a first operational amplifier coupled to said node;
   a second node coupled to a negative input of said first operational amplifier, a third resistance coupling said second node to ground;
   an output of said first operational amplifier coupled through a third resistance to said second node and through a fourth resistance to said first node;
   a second operational amplifier having positive and negative inputs and an output, said positive input coupled to said output of said first operational amplifier, said negative input coupled to said output.

15. A spline generator for generating an mth order spline function of a sequence, comprising:
   a memory for storing parameters of a B-spline precursor function which, when passed through a digital to analog converter and integrated $(m-1)$ times and buffered $(m-1)$ times, will yield a B-spline of the mth order;
   a multiplier, a first port of said multiplier receiving said B-spline precursor parameters, a second port of said multiplier receiving a string of spline coefficients derived from said signal, an output of said multiplier outputting a plurality of current multiplied precursor parameters in response to receiving said B-spline precursor parameters and said string of spline coefficients;
   a summer for summing said current multiplied precursor parameters with stored prior multiplied precursor function spline elements and generating an intermediate sequence in response thereto;
   a digital to analog converter having an input port for receiving the said intermediate sequence and an output port for outputting an intermediate signal; and
   $(m-1)$ integrating and buffering stages, each of said integrating and buffering stages comprising an integrator having an input port and an output and a buffer having an input coupled to said output of said integrator and an output port thereof, said input port of a first of said integrating and buffering stages operable to receive said intermediate signal, said mth order spline function of said signal appearing at said output port of a last of said integrating and buffering stages in response to said input port of said first stage receiving said intermediate signal.

16. The spline generator of claim 15, wherein each of said integrating and buffering stages comprises:
   an input port;
   a resistance for coupling said input port to a first node;
   a capacitor coupling said first node to ground, a positive input of a first operational amplifier coupled to said node;
   a second node coupled to a negative input of said first operational amplifier, a third resistance coupling said second node to ground;
   an output of said first operational amplifier coupled through a third resistance to said second node and through a fourth resistance to said first node;
   a second operational amplifier having positive and negative inputs and an output, said positive input coupled to said output of said first operational amplifier, said negative input coupled to said output.

17. A method for processing an analog signal F(t), comprising the steps of:
   sampling the signal F to obtain a plurality of digitized samples $\{F_n\}$, $F_n = F(nh)$, where h is the sampling period and n is the number of samples;
   generating a plurality of zero-level B-spline coefficients $c^0(n)$ as a weighted moving average of the digitized samples, according to the formula:

$$c^0(n) = \sum_i w^{(m)}_{n+(m/2)-il_m} F(il_m h)$$

where
   $i \in zz$,
   m is the order of spline,
   $w^{(m)}_{n+(m/2)-il_m}$ is one of a plurality of predetermined weights, and $l_{2x-1} = l_{2x} = x$, $x \in zz$;
   for each derived order of resolution $k = -1, -2, -3 \ldots$, performing the following steps:
   for $k \leq -2$, generating a plurality of (k+1)-level spline coefficients $c^{k+1}(n)$ from the (k+2) level spline coefficients $c^{k+2}(n)$ according to the formula:

$$c^{k+1}(n) = \sum_i a^{(m)}_{i-2n} c_i^{k+2}$$

where $\{a_n\}$ is a set of predetermined constants; and
   generating a plurality of (k) level wavelet coefficients $d^k(n)$ according to the formula:

$$d^k(n) = \sum_i b^{(m)}_{i-2n} c_i^{k+1}$$

where $\{b_n\}$ is a second set of predetermined constants,
   generating a spline $S_M f$, where M is larger integer and $l_m/2^M = h$, according to the formula $$S_M f(x) = \sum_j c^M_{(j)} N_m(2^M x - j)$$

where $N_m$ is a stored $m^{th}$ order of B-spline and $j \in zz$; and
   generating a wavelet function $g_k(x)$ from a plurality of wavelet coefficients $d_j^k$ according to the formula $$g_k(x) = \sum_j d_j^k \psi_m(2^k x - j)$$

where k is an integer and $\Psi_m$ is a basic wavelet of order m whereby the analog signal is processed for analyzing frequency information of the analog signal.

18. The method of claim 17, wherein m is selected to be 2.

19. The method of claim 17, wherein m is selected to be 4.

20. The method of claim 17, and further comprising the steps of:

processing selected resolution sets of the spline coefficients $c^k(n)$ and $d^k(n)$ to derive improved signal spline and wavelet coefficients $c^{*k}(n)$ and $d^{*k}(n)$, where k is an integer and varies between zero and q, and q is the order or resolution chosen during decomposition of the signal;

reconstructing improved signal spline coefficients $c^{*k+1}(n)$ according to the formula $$c_j^{*k+1} = \sum_n p_{j-2n} c_n^{*k} + q_{j-2n} d_n^{*k}$$

where $\{p_j\}$ is a set of spline reconstruction constants and $\{q_j\}$ is a set of wavelet reconstruction constants.

21. The method of claim 20, and further comprising the steps of reconstructing improved zero-level spline coefficients $c^{*0}(n)$ by reconstructing the spline coefficients $c^{*k+1}(n)$, where k varies between the selected order of resolution and zero; and generating a spline $F^*(t)$ as an improved approximation of the input analog signal $F(t)$.

22. A signal analyzer, comprising:

a sampler for sampling an input analog signal at a predetermined sampling rate;

a digitizer coupled to said sampler for digitizing a plurality of samples resulting from said input analog signal;

a B-spline interpolator for generating a plurality of B-spline coefficients of the zero-level in response to receiving the digital signal samples, said interpolator including a multiplier for multiplying a plurality of predetermined stored weights to respective selected ones of the digitized signal samples and a summer for summing the weighted digitized signal samples together in a moving average operation to derive the zero-level B-spline coefficients; and a multiplier for multiplying the zero-level B-spline coefficients in a moving average operation by a plurality of predetermined $B_n$-constants to derive a plurality of first-level wavelet coefficients;

a spline function generator for generating at least one spline function from at least one respective set of spline coefficients; and a wavelet generator for generating at least one wavelet function from at least one respective set of wavelet coefficients whereby said input analog signal is processed for analyzing frequency information of said input analog signal.

23. A signal analyzer, comprising:

means for receiving a plurality of digital signal samples;

means for generating a plurality of spline coefficients of the zero level in response to receiving the digital spline sample, said means for generating including means for multiplying a plurality of predetermined stored weights to respective selected ones of the digitized signal samples and means for summing the weighted digitized signal samples together in a moving average operation to derive zeroth-level B-spline coefficients;

means for multiplying the zeroth-level B-spline coefficients in a moving average operation by a plurality of $a_n$-constants to derive a plurality of first-level B-spline coefficients for the signal;

means for multiplying the zeroth-level B-spline coefficients in a moving average operation by a plurality of $b_n$-constants to derive a plurality of first-level wavelet coefficients;

means for generating at least one spline function from at least one respective set of spline coefficients; and means for generating a wavelet function from at least one respective set of wavelet coefficients whereby said signal is processed for analyzing frequency information of said signal.

* * * * *

UNITED STATES PATENT AND TRADEMARK OFFICE
CERTIFICATE OF CORRECTION

PATENT NO. : 5,262,958

DATED : November 16, 1993

INVENTOR(S) : Charles K. Chui, Andrew K. Chan

It is certified that error appears in the above-identified patent and that said Letters Patent is hereby corrected as shown below:

On title page, item [73] change, assignee to read:

--"The Texas A&M University System"--

Signed and Sealed this

Eighteenth Day of October, 1994

Attest:

BRUCE LEHMAN

Attesting Officer     *Commissioner of Patents and Trademarks*